US011985455B2

United States Patent
Suehiro et al.

(10) Patent No.: US 11,985,455 B2
(45) Date of Patent: May 14, 2024

(54) OPTICAL COMMUNICATION DEVICE AND RESOURCE MANAGEMENT METHOD

(71) Applicant: Mitsubishi Electric Corporation, Tokyo (JP)

(72) Inventors: Takeshi Suehiro, Tokyo (JP); Kenichi Nakura, Tokyo (JP); Akiko Iwasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 98 days.

(21) Appl. No.: 17/729,459

(22) Filed: Apr. 26, 2022

(65) Prior Publication Data
US 2022/0256262 A1    Aug. 11, 2022

Related U.S. Application Data

(63) Continuation of application No. PCT/JP2019/050278, filed on Dec. 23, 2019.

(51) Int. Cl.
*H04Q 11/00* (2006.01)
*H04B 10/27* (2013.01)

(52) U.S. Cl.
CPC ......... *H04Q 11/0062* (2013.01); *H04B 10/27* (2013.01); *H04Q 2011/0086* (2013.01)

(58) Field of Classification Search
CPC .................................................. H04Q 11/0067
See application file for complete search history.

(56) References Cited

U.S. PATENT DOCUMENTS

| 7,362,975 | B2 * | 4/2008 | Choi .................. | H04Q 11/0067 398/58 |
| 2015/0229431 | A1 * | 8/2015 | Sugawa .............. | H04J 14/0257 398/72 |

(Continued)

FOREIGN PATENT DOCUMENTS

| JP | 2016-116184 A | 6/2016 |
| JP | 2017-208769 A | 11/2017 |

(Continued)

OTHER PUBLICATIONS

Zhang et al., "Service-aware network slicing supporting delay-sensitive service for 5G fronthaul", OECC 2018, Jul. 2018 (Year: 2018).*

(Continued)

*Primary Examiner* — Shi K Li
(74) *Attorney, Agent, or Firm* — Birch, Stewart, Kolasch & Birch, LLP

(57) ABSTRACT

An OLT connected with a controller managing slices includes a bandwidth allocating unit capable of allocating bandwidths in a PON system to ONUs through allocation methods, a slice managing unit that calculates a guaranteed delay time for each allocation method, receives, from the controller, a resource reservation request including a bandwidth requested to be reserved in the PON system for a slice and a requested delay time, and determines an allocation method associated with the request based on the requested delay time and the guaranteed delay time for each allocation method, and a resource information generating unit that holds, as abstract resource information, an available bandwidth for the guaranteed delay times of each ONUs, calculates an available bandwidth in the allocation method of the associated ONU based on the allocation method associated with the request and the requested bandwidth, and updates and transmits the abstract resource information, to the controller.

8 Claims, 15 Drawing Sheets

(56) References Cited

U.S. PATENT DOCUMENTS

| | | | |
|---|---|---|---|
| 2015/0311980 A1 | 10/2015 | Kuwano et al. | |
| 2016/0080208 A1* | 3/2016 | Takemoto | H04L 12/44 398/66 |
| 2020/0404401 A1* | 12/2020 | Hisano | H04Q 11/0067 |
| 2021/0076220 A1 | 3/2021 | Hirano et al. | |
| 2022/0086544 A1* | 3/2022 | Zhang | H04Q 11/0067 |

FOREIGN PATENT DOCUMENTS

| | | |
|---|---|---|
| JP | 2018-101912 A | 6/2018 |
| WO | WO 2014/077168 A1 | 5/2014 |
| WO | WO 2019/229801 A1 | 12/2019 |
| WO | WO 2021/053759 A1 | 3/2021 |

OTHER PUBLICATIONS

Uzawa et al., "Practical Mobile-DBA Scheme Considering Data Arrival Period for 5G Mobile Fronthaul with TDM-PON", 2017 ECOC, IEEE, 2017 (Year: 2017).*

Office Action issued in Japanese Application No. 2020-518829, dated Jul. 8, 2020.

Zhang et al., "Service-aware Network Slicing Supporting Delay-Sensitive Services for 5G Fronthaul," The 23rd OptoElectronics and Communications Conference (OECC 2018) Technical Digest, Jeju, Korea, Jul. 2-6, 2018, total 2 pages.

Chinese Office Action and Search Report for Chinese Application No. 201980102990.0, dated Sep. 9, 2023, with an English translation.

\* cited by examiner

FIG.6

| ONU | DELAY CLASS | GUARANTEED DELAY TIME |
|---|---|---|
| ONU2-1 | 1 | 100 μs |
| | 2 | 300 μs |
| | 3 | - |
| ONU2-2 | 1 | 150 μs |
| | 2 | 350 μs |
| | 3 | - |

FIG.7

| No. | PORT PAIR | REQUESTED DELAY TIME | REQUESTED BANDWIDTH |
|---|---|---|---|
| 1 | (2-1, 1) | 100 μs | 1 Gbps |
| 2 | (2-2, 1) | 325 μs | 2 Gbps |
| 3 | (2-1, 1) | 325 μs | 3 Gbps |
| 4 | (2-1, 1) | - | 4 Gbps |
| ... | | | |

FIG.8
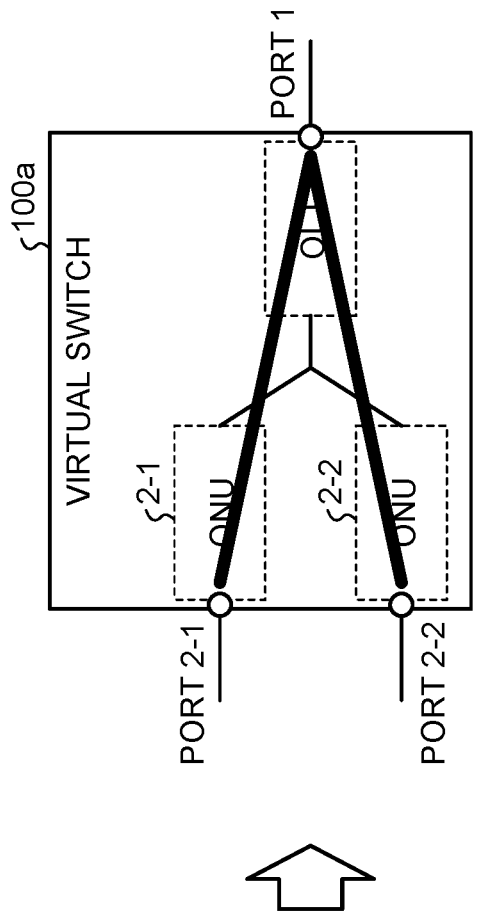
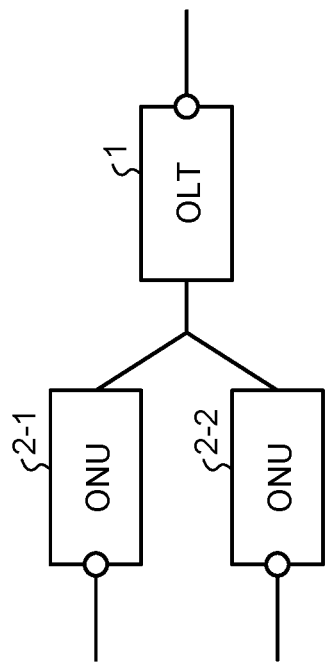

FIG.9

| No. | ONU | DELAY CLASS | REQUESTED BANDWIDTH |
|---|---|---|---|
| 1 | ONU2-1 | 1 | 1 Gbps |
| 2 | ONU2-2 | 1 | 2 Gbps |
| 3 | ONU2-1 | 2 | 3 Gbps |
| 4 | ONU2-1 | - | 4 Gbps |
| ... | | | |

FIG.11

| PORT PAIR | DELAY CLASS | GUARANTEED DELAY TIME | AVAILABLE BANDWIDTH |
|---|---|---|---|
| (2-1, 1) | 1 | 100 μs | 3 Gbps |
| | 2 | 300 μs | 10 Gbps |
| | 3 | - | 10 Gbps |
| (2-2, 1) | 1 | 150 μs | 2 Gbps |
| | 2 | 350 μs | 10 Gbps |
| | 3 | - | 10 Gbps |

OPTICAL COMMUNICATION DEVICE AND RESOURCE MANAGEMENT METHOD

CROSS-REFERENCE TO RELATED APPLICATION

This application is a continuation application of International Application PCT/JP2019/050278, filed on Dec. 23, 2019, and designating the U.S., the entire contents of which are incorporated herein by reference.

BACKGROUND OF THE INVENTION

1. Field of the Invention

The disclosure relates to an optical communication device that is a master station device in a passive optical network (PON) system and that informs a controller of communication resources in the PON system, and a resource management method for the optical communication device.

2. Description of the Related Art

Various forms of communication services have become popular. With wide spread of use of such communication uses, studies are ongoing on technology for providing a single communication network that contains a plurality of services required to meet different conditions for communication. Examples of the services required to meet the different conditions for communication include mobile broadband services that require high data rates, mission-critical services that require high reliability and low delay, and sensor information gathering services that require high-density accommodation of devices.

One example of the technology for providing the single communication network that contains the plurality of services required to meet the different conditions for communication is to allocate communication services to each of a plurality of virtual networks obtained by logically dividing a communication network, such that each communication service transmits/receives data, using the allocated virtual network. Note that the virtual networks obtained by logically dividing the communication network are also called slices. Each of the virtual networks obtained by logically dividing the communication network will be hereinafter referred to as a slice.

Slices are managed by a controller that controls devices included in a communication network. The communication services associated with the individual slices require communication resources. The controller for managing the slices reserves such required communication resources from among communication resources available for the devices of the communication network, and allocates the reserved communication resources to individual slices.

In order to allocate, to a slice, communication resources necessary for providing a requested communication service, technology for accurately and efficiently gathering and managing information on communication resources held by devices has been studied (refer to Japanese Patent Application Laid-open No. 2016-116184, for example).

In the disclosure described in Japanese Patent Application Laid-open No. 2016-116184, a network monitoring device that monitors a physical network holds information on communication resources held by devices of the physical network and information on connection between the devices. These pieces of information are held in a table form. In response to a slice operation request, such as a request for generating, updating, or deleting a slice, the network monitoring device refers to the table to provide necessary information to an operator. In accordance with a result of an operator's operation for slice setting, the network monitoring device updates the information on communication resources held by devices present on a communication path on which the slice is generated, and information on connection between these devices.

In the disclosure described in Japanese Patent Application Laid-open No. 2016-116184, when a new slice operation request is received, the network monitoring device, which is a controller, refers to the information on the communication resources allocated to the devices of the physical network and determines available communication resources. In a case where each device of the communication network is, for example, a layer 2 switch device that simply transfer Ethernet (registered trademark) frames from an input port to an output port, it is easy for the network monitoring device to calculate available communication resources from information on a transmission rate at each port of the device and a switching capacity in the device and information on communication resources allocated to the slice. In the presence of a PON system in the communication network, unfortunately, it is not easy for the network monitoring device to accurately calculate available communication resources. The reasons therefor are as follows.

A PON system is defined by an optical line terminal (OLT), which is an optical communication device, and optical network units (ONUs), which are optical communication devices. A first reason why it is not easy for the network monitoring device to accurately calculate available communication resources is that a plurality of ONUs connected to one OLT share communication resources. For example, when a communication resource for an ONU is allocated to a slice, available resources of the other ONUs as well as the available resource of that ONU decrease. As a result, the network monitoring device needs to update the information on communication resources held by devices other than the device present on the communication path on which the slice is generated. This makes communication resource management complicated.

A second reason why it is not easy for the network monitoring device to accurately calculate available communication resources is that a function called dynamic bandwidth allocation (DBA) is used for allocation of communication resources in a PON system. The OLT allocates communication resources for communication between the OLT and the ONUs through the DBA. In the DBA, a plurality of kinds of allocating operations can be performed, and the OLT can change the allocating operations. Depending on what allocation operation is performed, the communication resources allocated to the individual ONUs also change. Thus, in order to accurately calculate available communication resources for individual devices, the network monitoring device needs to obtain what allocation operations are performed in the DBA, which makes communication resource management complicated.

SUMMARY OF THE INVENTION

To solve the aforementioned problems, an optical communication device according to the disclosure is a master station device, the master station and a plurality of slave station devices defining a passive optical network system, the optical communication device being connected to a controller to manage communication resources in slices, the slices being virtual networks into which a network is divided. The optical communication device comprises a bandwidth allocating unit capable of allocating bandwidths in the passive optical network system to the slave station devices through a plurality of allocation methods. The optical communication device also comprises a slice managing unit to calculate a guaranteed delay time associated with each of the allocation methods, hold the guaranteed delay time associated with each of the allocation methods, receive, from the controller, a resource reservation request including a requested bandwidth requested to be reserved in the passive optical network system for a slice and a requested delay time in the passive optical network, and determine an allocation method associated with the resource reservation request on the basis of the requested delay time included in the resource reservation request and the guaranteed delay time for each of the allocation methods. The optical communication device further comprises a resource information generating unit to hold, as resource information, an available bandwidth for each guaranteed delay time of each of the slave station devices, calculate an available bandwidth in the allocation method for a slave station device associated with the resource reservation request, on the basis of the allocation method associated with the resource reservation request and the requested bandwidth included in the resource reservation request, update the resource information with the calculated available bandwidth, and transmit the resource information to the controller.

BRIEF DESCRIPTION OF THE DRAWINGS

FIG. 6 is a table illustrating an example of a guaranteed delay time for each delay class of each ONU according to the embodiment;

FIG. 7 is a table illustrating examples of resource reservation requests according to the embodiment;

FIG. 8 is a diagram for explaining a virtual layer 2 switch according to the embodiment;

FIG. 9 is a table illustrating an example of classification information according to the embodiment;

FIG. 11 is a table illustrating an example of abstract resource information according to the embodiment;

DETAILED DESCRIPTION OF THE PREFERRED EMBODIMENTS

An optical communication device and a resource managing method according to an embodiment of the disclosure will be described in detail below with reference to the drawings.

Embodiment

Figure 1:
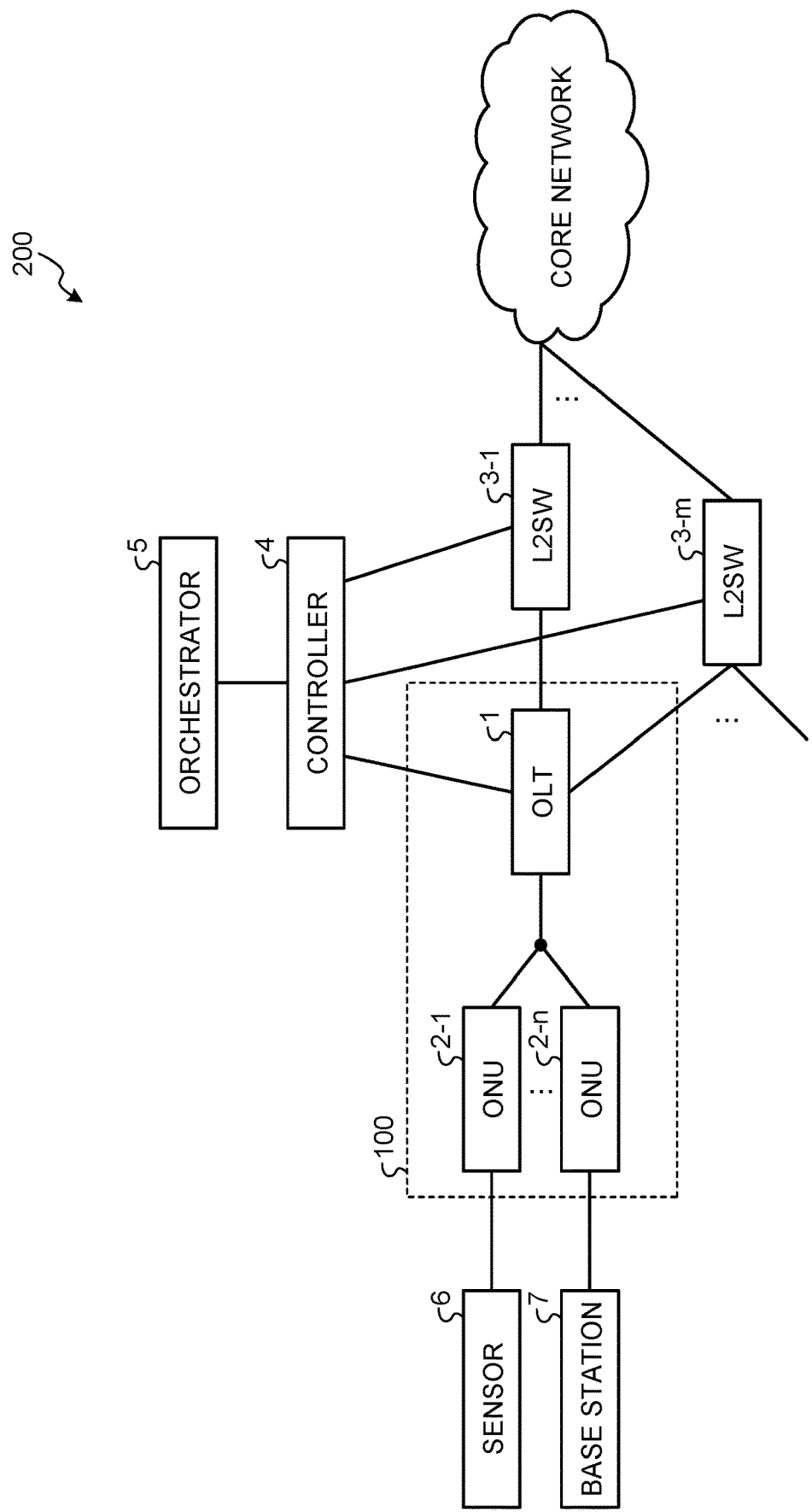
FIG. 1 is a diagram illustrating an example of a configuration of a communication system according to an embodiment.

FIG. 1 is a diagram illustrating an example of a configuration of a communication system according to an embodiment. As illustrated in FIG. 1, a communication system 200 according to the present embodiment includes PON systems 100, layer 2 switches (abbreviated as L2SW in FIG. 1) 3-1 to 3-*m*, a controller 4, which is a network management and control device, and an orchestrator 5. m is an integer not smaller than 2. Although not illustrated in FIG. 1, the communication system 200 includes a plurality of PON systems 100. In the following description, each of the layer 2 switches 3-1 to 3-*m* will also be referred to as a layer 2 switch 3 when the layer 2 switches 3-1 to 3-*m* need not be individually distinguished from each other such as in explanation of common features thereof. Although one PON system 100 is illustrated in FIG. 1, the communication system 200 may include a plurality of PON systems 100.

A PON system 100 is defined by an OLT 1 and a plurality of ONUs 2-1 to 2-*n*. The OLT 1 is a master station device, and the ONUs 2-1 to 2-*n* are slave station devices. The OLT 1 and the ONUs 2-1 to 2-*n* are optical communication devices. n is an integer equal to or greater than 2. In the following description, each of the ONUs 2-1 to 2-*n* will also be referred to as an ONU 2 when the ONUs 2-1 to 2-*n* need not be individually distinguished from each other such as in explanation of common features thereof.

The OLT 1 is connected to the ONUs 2-1 to 2-*n* via optical fibers. In the example illustrated in FIG. 1, a single optical fiber connected to the OLT 1 is divided by a passive element into connection to the ONUs 2-1 to 2-*n*. In addition, the OLT 1 is connected to the layer 2 switches 3-1 to 3-*m* and the controller 4. The numbers of ONUs 2 and layer 2 switches 3, which are connected to the OLT 1, are not limited to those illustrated in FIG. 1. The number of ONUs 2 connected to the OLT 1 may be one. The number of layer 2 switches 3 connected to the OLT 1 may be one.

A sensor 6 is connected to the ONU 2-1, and a base station 7 is connected to the ONU 2-*n*. The base station 7 is a base station of a mobile communication system, for example. Note that the sensor 6 and the base station 7 are examples of devices connected to the ONUs 2, and the devices connected to the ONUs 2 are not limited thereto. While FIG. 1 illustrates the sensor 6 connected directly to the ONU 2-1, in another example, an access point in a wireless local area network (LAN) is connected to the ONU 2-1 and the sensor 6 is connected to the access point. A plurality of sensors 6 may be connected to the ONU 2-1. Similarly, a plurality of base stations 7 may be connected to the ONU 2-*n*. In addition, a plurality of kinds of devices may be connected to each of the ONUs 2.

The layer 2 switches 3 are connected with one or more OLTs 1, aggregates communication data from each of the OLTs 1, and transfers the communication data to a core network. In addition, the layer 2 switches 3 each identify a destination of communication data from the core network, and transfer the communication data to the OLT 1 associated with the ONU 2 connected to the device which is that destination. The layer 2 switches 3 transmits available communication resources to the controller 4, using ports of the layer 2 switches 3. The available communication resources are resource information indicating bandwidths in which transfer can be performed.

The controller 4, which is connected to the OLT 1 and each of the layer 2 switches 3, controls the layer 2 switches 3, and the OLT 1 and the ONUs 2 that define the PON system 100. The controller 4 manages communication resources in slices. The slices are virtual networks into which the network of the communication system 200 is divided. Note that the controller 4 controls the ONUs 2 via the OLT 1. Alternatively, the controller 4 may control the OLT 1 and the ONUs 2 via the layer 2 switches 3, in which case, the layer 2 switches 3 performs a process of superimposing communication data for control from the controller 4 on user data and transferring resulting data to the OLT 1, and a process of separating the user data and the communication data for control coming from the OLT 1 and transferring the communication data to the controller 4. The user data, which is data transmitted from a source device to a destination device by the communication system 200, includes data transmitted from the sensor 6 to the core network via the PON system 100, and data transmitted from the core network to the base station 7 via the PON system 100, for example.

The controller 4 collects information on available communication resources from controlled devices, that is, from communication devices included in the communication system 200, or more specifically, the OLT 1 and the layer 2 switches 3. In addition, upon receiving a request for generating a slice from the orchestrator 5, the controller 4 determines, on the basis of the information on communication resources, whether or not a slice that meets the request can be generated, and if such a slice can be generated, generates the slice and allocates communication resources to the slice. The allocation of communication resources used herein refers to a process of transmitting a resource reservation request to each communication device to reserve communication resources to be used for communication in the generated slice. The reserved communication resources are allocated to the individual ONUs 2 by the OLT 1, and used for transmission of user data by the ONUs 2. Specifically, the OLT 1 allocates communication resources to the individual ONUs 2 connected with the OLT 1 in accordance with the received resource reservation request.

In accordance with an instruction from an external application or a service user, the orchestrator 5 requests the controller 4 to generate a slice necessary for providing services. Note that a slice-related operation request by the orchestrator 5 can be a request to update a generated slice or a request to delete a generated slice.

Note that a physical network that connects the controller 4 to the individual communication devices included in the communication system 200 may be a dedicated network for transmitting the communication traffic for control or may be a shared network for also transmitting user data.

Figure 2:
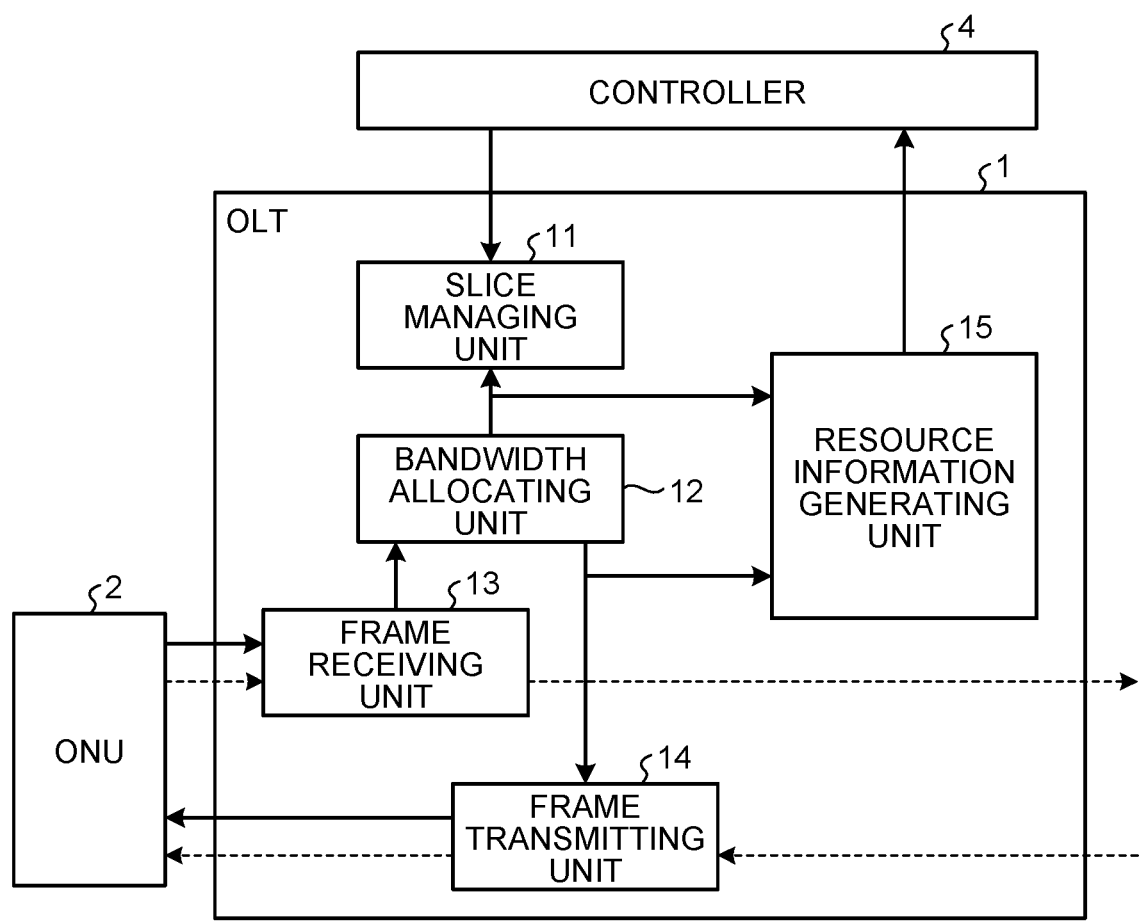
FIG. 2 is a diagram illustrating an example of a functional block configuration of an OLT according to the embodiment.

FIG. 2 is a diagram illustrating an example of a functional block configuration of the OLT 1 according to the present embodiment. As illustrated in FIG. 2, the OLT 1 includes a slice managing unit 11, a bandwidth allocating unit 12, a frame receiving unit 13, a frame transmitting unit 14, and a resource information generating unit 15. Note that, in FIG. 2, dashed arrows indicate the flow of user data, and solid arrows indicate the flow of control data, which are data used for control. In addition, although not illustrated in FIG. 2, the layer 2 switches 3, in addition to the OLT 1, are connected to the controller 4 as illustrated in FIG. 1. Furthermore, in a case where the communication system 200 is configured to include a plurality of PON systems 100, a plurality of OLTs 1 are connected to the controller 4. In addition, although a single ONU 2 is illustrated in FIG. 2, a plurality of ONUs 2 may be connected to the OLT 1 as described above.

The slice managing unit 11 classifies resource reservation requests input from the controller 4, into delay classes. Details of the operation of the slice managing unit 11 will be described later.

The bandwidth allocating unit 12 can allocate bandwidths in the PON system 100 to the ONUs 2 through a plurality of allocation methods. A bandwidth for uplink communication is allocated to each of the ONUs 2, and the allocation result is output as control data of the PON system 100 to the frame transmitting unit 14 and the resource information generating unit 15. Note that the bandwidths used herein are communication resources used in the PON system 100. The bandwidth allocation methods used by the bandwidth allocating unit 12 include three methods: fixed allocation; status report allocation; and best effort allocation, for example. The allocation methods will be described later. In the case of the status report allocation, the bandwidth allocating unit 12 calculates a necessary amount of bandwidth to be used for data transmission for each of the ONUs 2, on the basis of information transmitted as control data from each ONU 2, which information indicates an amount of data held by each ONU 2 for transmission to the OLT 1. Details of the operation of the bandwidth allocating unit 12 will be described later.

The frame receiving unit 13 has functions of separating user data in an uplink direction input from an ONU 2 from control data to be used for control in the PON system 100, and transferring the user data and the control data to the core network and the bandwidth allocating unit 12, respectively.

The frame transmitting unit 14 has functions of aggregating user data in a downlink direction input from the core network via the layer 2 switches 3 and control data input from the bandwidth allocating unit 12 to be used for control in the PON system 100, and transferring the aggregated data to an ONU 2 corresponding to the destination of the user data.

The resource information generating unit 15 calculates an available bandwidth for each of the delay classes of the ONUs 2, regards the PON system 100 as one virtual layer 2 switch, and generates abstract resource information that is resource information for the virtual layer 2 switch. The resource information generating unit 15 transmits the abstract resource information to the controller 4. Details of the delay classes, the operations of the virtual layer 2 switch and the resource information generating unit 15 will be described later.

Note that, in the case where a plurality of ONUs 2 are connected to the OLT 1, the ONUs 2 are connected to the frame receiving unit 13 and the frame transmitting unit 14 illustrated in FIG. 1. The frame receiving unit 13 separates user data received from each of the ONUs 2 from control data, transfers the user data to the core network, and transfers the control data to the bandwidth allocating unit 12. In addition, the frame transmitting unit 14 aggregates user data in the downlink direction associated with each of the ONUs 2 and input from the core network and control data input from the bandwidth allocating unit 12, and transfers the aggregated data to an ONU 2 corresponding to the destination of the user data.

Bandwidth allocation at the OLT 1 will now be explained. What kind of bandwidth to be allocated to each ONU 2 varies depending on the standard or the like used in the PON system 100. For example, according to 10G-EPON defined by IEEE (Institute of Electrical and Electronics Engineers) 802.3, the uplink communication is performed by the time division multiplexing (TDM) method. Thus, in a case where the PON system 100 is a 10G-EPON system, transmission time slots are allocated to the individual ONUs 2. According to NG-PON2 defined by ITU-T (International Telecommunication Union Telecommunication Standardization Sector) G.989 series, the uplink communication is performed by the time and wavelength division multiplexing (TWDM) method that is a combination of the wavelength division multiplexing method and the TDM method. Thus, in a case where the PON system 100 is a NG-PON2 system, transmission time slots and wavelengths are allocated to the individual ONUs 2.

An example in which the PON system 100 is a 10G-EPON system will first be explained. In this case, the bandwidth allocating unit 12 allocates transmission time slots to the individual ONUs 2. A transmission time slot is specified by a start timing at which transmission from each ONU 2 is to be permitted and the length of transmission time, for example.

Figure 3:
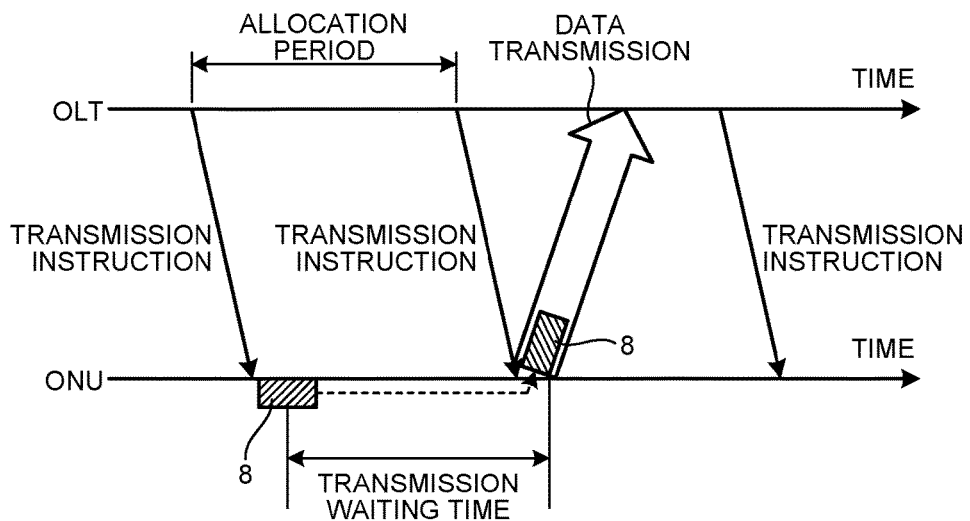
FIG. 3 is a diagram for explaining fixed allocation in an OLT according to the embodiment.

Next, the bandwidth allocation method used by the bandwidth allocating unit 12 will be explained. FIG. 3 is a diagram for explaining fixed allocation in the OLT 1 according to the present embodiment. In the method illustrated in FIG. 3, a period called an allocation period is set, and the bandwidth allocating unit 12 allocates a fixed bandwidth per allocation period. Specifically, the bandwidth allocating unit 12 allocates, to each ONU 2, a start timing at which transmission is to be permitted and a time length per allocation period. Hereinafter, a start timing at which transmission is to be permitted and a time length will also be referred to as an allocation amount. Specifically, as illustrated in FIG. 3, the bandwidth allocating unit 12 generates control data indicating a transmission instruction for notifying each ONU 2 of an allocation amount per allocation period, and transmits the control data to the ONU 2 via the frame transmitting unit 14. Each ONU 2 transmits transmission data 8 that the ONU 2 holds, in a time slot indicated in the allocation amount per allocation period.

While an example in which an allocation amount is calculated for each ONU 2 is described herein, the bandwidth allocating unit 12 can also calculate an allocation amount for each slice for the individual ONUs 2. In this case, each ONU 2 manages transmission data 8 slice-by-slice, and transmits transmission data 8 slice-by-slice by using a bandwidth allocated to the slice. Each frame of transmission data 8 contains information allowing slice identification.

In the case where the bandwidth allocating unit 12 performs allocation through the method illustrated in FIG. 3, allocation amounts for the ONUs 2 in individual allocation periods are fixed. Thus, even in a case where a necessary amount, which is a bandwidth necessary for transmission by an ONU 2, is smaller than a fixed allocation bandwidth, which is a fixed allocation amount, the fixed allocation bandwidth is allocated to the ONU 2. In such a case, bandwidths that are allocated to ONUs 2 but are not used for transmission exist, which lowers bandwidth use efficiency. Note that the maximum time from storage of transmission data 8 in an ONU 2 until transmission of the transmission data 8 is equal to the allocation period. Alternatively, for example, an allocation method of assigning a plurality of transmission permission start timings to each ONU 2 within an allocation period can be used, and in such a case, the maximum time during which an ONU 2 waits before transmission of transmission data can be made shorter than the allocation period.

Figure 4:
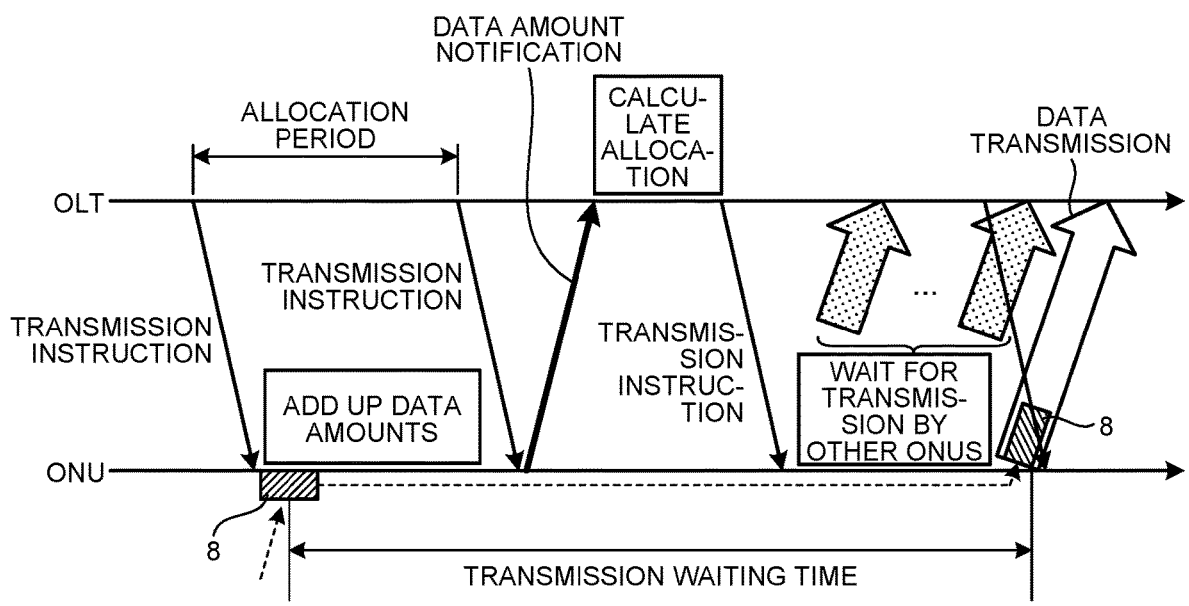
FIG. 4 is a diagram for explaining status report allocation in the OLT according to the embodiment.

FIG. 4 is a diagram for explaining the status report allocation in the OLT 1 according to the present embodiment. In the status report allocation, each ONU 2 adds up the data amounts of transmission data 8 that the ONU 2 holds, and notifies the OLT 1 of the total data amount, and the OLT 1 determines the allocation amount for each ONU 2 on the basis of the data amounts received from the ONUs 2. Thus, in the status report allocation, the bandwidth allocating unit 12 allocates a bandwidth depending on a necessary amount for an ONU 2, of which the ONU 2 notifies the bandwidth allocating unit 12. Specifically, each ONU 2 is allotted a transmission time slot for the ONU 2 to notify the OLT 1 of a data amount in each allocation period. During this allotted transmission time slot, the ONU 2 notifies the OLT 1 of the data amount of transmission data 8 held by the ONU 2. The bandwidth allocating unit 12 performs allocation calculation in each allocation period on the basis of the data amount of which the ONU 2 notifies the allocating unit 12. The allocation calculation is calculation of an amount of allocation to each ONU 2. The bandwidth allocating unit 12 then generates control data indicating a transmission instruction that notifies each ONU 2 of the allocation amount, and transmits the control data to the ONU 2 via the frame transmitting unit 14.

In the status report allocation, an allocation amount is calculated depending on a necessary amount for each ONU 2, which can increase the bandwidth use efficiency. The maximum time during which an ONU 2 waits before transmission of transmission data 8 is, unfortunately, a total of: an allocation period for adding up the data amount of data held by the ONU 2; the subsequent allocation period following the aforementioned allocation period, during which subsequent allocation period the ONU 2 notifies the OLT 1 of the data amount and the OLT 1 calculates an allocation amount; and a waiting time during which to allow transmission from other ONUs 2. Thus, the maximum time during which an ONU 2 waits before transmission of transmission data 8 is a total of two allocation periods and a time for waiting during which to allow transmission from other ONUs 2. Assume that an ONU 2 among all the ONUs 2 connected to the OLT 1 is allocated the last time slot, for example. In the allocation calculation performed by the bandwidth allocating unit 12, that ONU 2 allocated the last time slot waits for transmission from other ONU 2 a time equal to the allocation period. Thus, in the case of the status report allocation, the maximum time during which to wait before transmission of transmission data 8 is three times the allocation period, and the shortest time that can be guaranteed is therefore longer than that in the case of the fixed allocation. Note that an allocation amount that corresponds to a necessary amount is not always assigned to each ONU 2. Allocation amounts can be adjusted among the ONUs 2. In some case, a maximum allocation bandwidth, which is a maximum amount of allocation, is set for each ONU 2 and the ONU 2 is not allocated beyond the maximum allocation bandwidth.

Typically, the allocating operation of the OLT 1 can be performed combining fixed allocation and status allocation. In the OLT 1 of the present embodiment as well, the bandwidth allocating unit 12 can perform the operation of each of fixed allocation and status allocation. The PON system 100 of the present embodiment provides two different kinds of delay time that can be guaranteed for transmission data in correspondence to the method of allocating operation. These kinds of delay time are: a delay time equivalent to the allocation period; and a delay time equivalent to three times the allocation period.

A delay time of transmission data in the PON system 100 include, in addition to the delay time due to bandwidth allocation described above, a processing time at each ONU 2, a time of transmission from each ONU 2 to the OLT 1, and a processing time at the OLT 1. Thus, for each ONU 2, a delay time that can be guaranteed by the PON system 100 is obtained by adding these times and transmission time to the delay time due to bandwidth allocation. The PON system 100 can guarantee the delay time, the number of which is the same as the number of guaranteeable delay times depending on the kind of the DBA, and these will be referred to as delay classes. There are two delay classes, one of which corresponds to the fixed allocation and the other corresponds to the status report allocation described above. Additionally, a class without delay guarantee can further be defined. In the present embodiment, three delay classes, which include the two different delay classes corresponding to the fixed allocation and the status report allocation, respectively, and a delay class without delay guarantee, are defined. Note that communication data in the delay class without delay guarantee is allocated a remainder resulting from allocation to communication data in the classes with delay guarantee.

Figure 5:
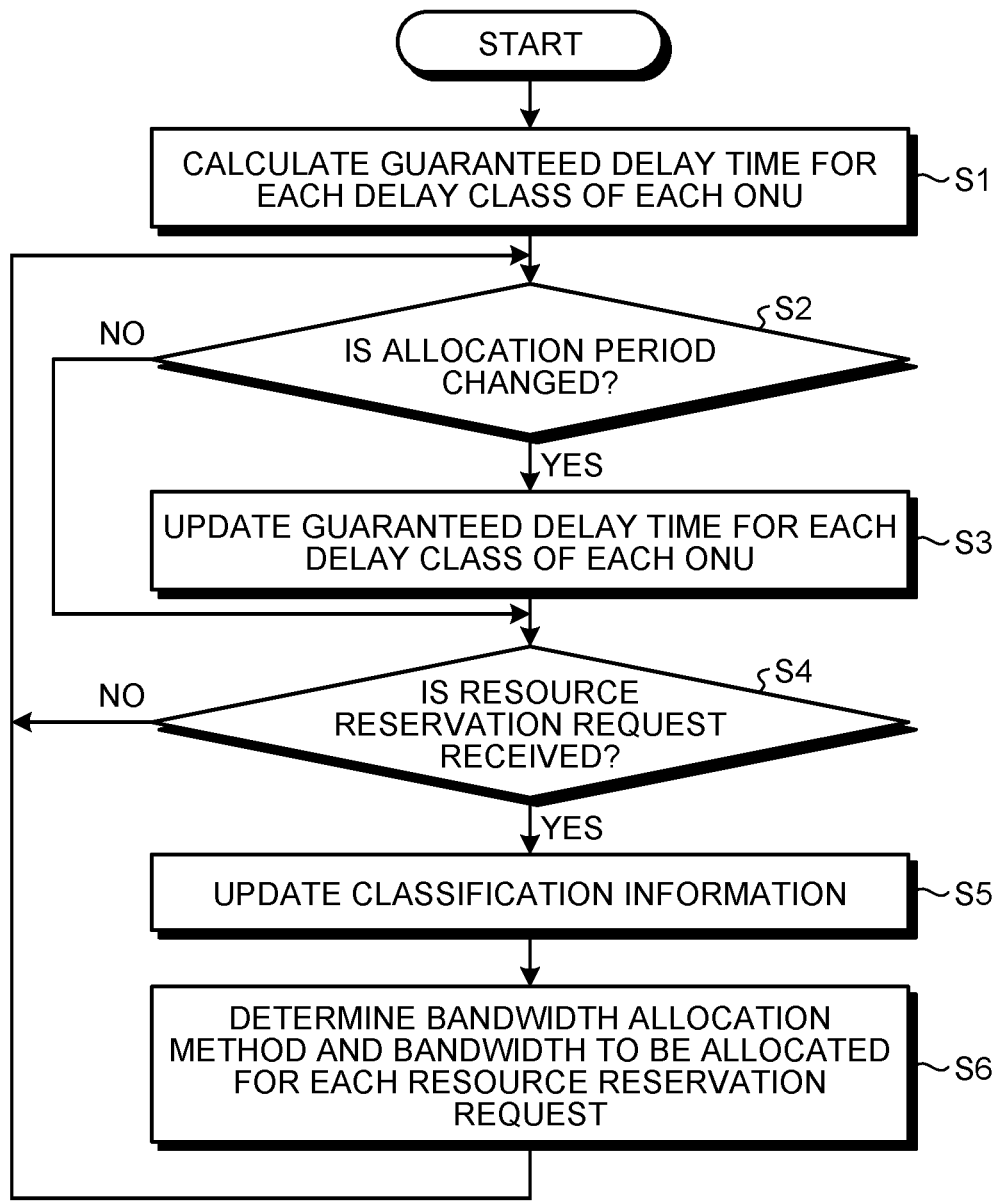
FIG. 5 is a flowchart illustrating an example of procedures performed by a slice managing unit according to the embodiment.

Next, the operation of the slice managing unit 11 will be described. FIG. 5 is a flowchart illustrating an example of procedures performed by the slice managing unit 11 according to the present embodiment. As illustrated in FIG. 5, the slice managing unit 11 first calculates a guaranteed delay time for each delay class of each ONU 2 (step S1). The slice managing unit 11 holds the calculated guaranteed delay time in each delay class. A guaranteed delay time is a delay time that can be guaranteed when the PON system 100 transfers communication data. In other words, a guaranteed delay time is the maximum delay time that occurs when the PON system 100 transfers communication data.

A guaranteed delay time includes processing times at each ONU 2 and the OLT 1, and a time of transmission from the ONU 2 to the OLT 1 in addition to a maximum time during which the ONU 2 waits before transmission of transmission data, that is, a maximum waiting time of transmission data at the ONU 2. Note that the processing times at the ONU 2 and the OLT 1 should be construed as being negligible as compared with the maximum waiting time of transmission data at the ONU 2, and the guaranteed delay time is approximated as being equal to a sum of the maximum waiting time of transmission data at the ONU 2 and the time of transmission from the ONU 2 to the OLT 1. Typically, in the PON system 100, the OLT 1 measures a round trip time (RTT) between the OLT 1 and each ONU 2 at certain point such as upon connection to the ONU 2 with a control unit or the like, which is not illustrated. The slice managing unit 11 can calculate the time of transmission from the ONU 2 to the OLT 1 by multiplying the RTT by ½. The method for determining the time of transmission from the ONU 2 to the OLT 1 is not limited to this example. Note that, in calculation of an actual guaranteed delay time, the processing times at the ONU 2 and the OLT 1 may also be taken into consideration.

The maximum waiting time of transmission data at the ONU 2 corresponds to the allocation period in the case of fixed allocation, or corresponds to three times the allocation period in the case of status report allocation. In addition, in the case of best effort allocation, no guaranteed delay time is set. A delay class associated with the fixed allocation is hereinafter defined as delay class 1, a delay class associated with the status report allocation is defined as delay class 2, and a delay class associated with the best effort allocation is defined as delay class 3.

FIG. 6 is a table illustrating an example of the guaranteed delay time for each delay class of each ONU 2 according to the present embodiment. In the example illustrated in FIG. 6, the allocation period is 100 µs, and two ONUs 2, which are the ONU 2-1 and the ONU 2-2, are connected to the OLT 1. In addition, assume that the ONU 2-1 is located near the OLT 1, the time of transmission from the ONU 2-1 to the OLT 1 is negligible, and the time of transmission from the ONU 2-2 to the OLT 1 is 50 µs. FIG. 6 illustrates an example, and the number of ONUs 2, the allocation period, and the time of transmission from an ONU 2 to the OLT 1 is not limited to those in the example illustrated in FIG. 6.

Reference is made back to FIG. 5. Subsequently, the slice managing unit 11 determines whether or not the allocation period is changed (step S2). Note that the bandwidth allocating unit 12 can change the allocation period. When the bandwidth allocating unit 12 changes the allocation period, the bandwidth allocating unit 12 then notifies the slice managing unit 11 of the changed allocation period. As for an initial value of the allocation period, the bandwidth allocating unit 12 may notify the slice managing unit 11 of the initial value of the allocation period or the slice managing unit 11 may hold the initial value of the allocation period.

If the allocation period is changed (step S2, Yes), the slice managing unit 11 updates the guaranteed delay time for each delay class of each ONU 2 (step S3). The slice managing unit 11 determines whether or not a resource reservation request is received (step S4), and if a resource reservation request is received (step S4, Yes), updates classification information (step S5). The slice managing unit 11 holds the updated classification information. As described above, a resource reservation request is transmitted from the controller 4 in order to reserve communication resources to be used for communication in each slice. A resource reservation request includes a requested bandwidth, which is requested to be reserved for a slice in the PON system 100, and a requested delay time in the PON system 100. The classification information is information indicating a result of classification of resource reservation requests into delay classes. Details of the classification information will be described later.

FIG. 7 is a table illustrating examples of resource reservation requests according to the present embodiment. In FIG. 7, four resource reservation requests from No. 1 to No. 4 are illustrated. As illustrated in FIG. 7, a resource reservation request includes a port pair, a requested delay time, and a requested bandwidth. The port pair, details of which will be described later, is information indicating a frame transfer path when the PON system 100 is regarded as a virtual layer 2 switch.

A virtual layer 2 switch and a port pair in the present embodiment will now be described. FIG. 8 is a diagram for explaining a virtual layer 2 switch according to the present embodiment. Left part of FIG. 8 illustrates an example of a configuration of the PON system 100 in which two ONUs 2, which are the ONU 2-1 and the ONU 2-2, are connected to the OLT 1. Right part of FIG. 8 illustrates a virtual switch 100*a* in a case where the PON system 100 illustrated in the left part is regarded as the virtual switch 100*a*, which is one virtual layer 2 switch. A layer 2 switch manages which communication devices is connected to each port, and transfers a frame to an associated port in accordance with the communication device that is the destination of the frame. In the virtual switch 100*a* illustrated in FIG. 8, a PON section is hidden, and two ports of the ONU 2-1 and the ONU 2-2 on the downlink side, that is, opposite the side of the OLT 1 are regarded as ports 2-1 and 2-2, respectively, of the virtual switch 100*a*. In addition, in the virtual switch 100*a*, a port of the OLT 1 on the uplink side, that is, opposite the side of the ONUs 2 is regarded as port 1 of the virtual switch 100*a*. Herein, the identification number of each port of the port pair is the same as the identification number of the associated communication device. Note that, actual identification numbers are not the reference numerals of the communication devices but can be any identification information such as addresses used in the PON system 100, or port numbers of the virtual switch 100*a*.

In a case where the sensor 6 illustrated in FIG. 1 is to transmit data to a destination communication device via the core network, for example, the ONU 2-1 transfers the data received from the sensor 6, to the OLT 1. This corresponds to the virtual switch 100*a* outputting, through port 1, data received from port 2-1. For example, port pair (2-1, 1) indicates a frame transfer from the ONU 2-1 to the OLT 1. In the example illustrated in FIG. 8, two port pairs for uplink communication of the virtual switch 100*a* are pair (2-1, 1) and pair (2-2, 1). The former number in the parentheses of each port pair is the identification number of a port of the virtual layer 2 switch associated with a transfer source, and the latter number therein is the identification number of a port of the virtual layer 2 switch associated with a transfer destination.

Reference is made back to FIG. 7. The requested delay times illustrated in FIG. 7 each indicate a delay time requested in communication in a slice associated with a resource reservation request. In the communication in a slice associated with a resource reservation request, it is desired that the guaranteed delay time in the PON system 100 be equal to or shorter than a requested delay time. A requested bandwidth is a bandwidth to be reserved by the PON system 100 for communication in a slice associated with a resource reservation request. While FIG. 7 illustrates pieces of information included in individual resource reservation requests together in a form of a table, each resource reservation request is individually transmitted, and each resource reservation request includes information as illustrated in FIG. 7.

As illustrated in FIG. 7, resource reservation request No. 1 requests a bandwidth of 1 Gbps with a requested delay time of 100 μs on a communication path using the ONU 2-1. Resource reservation request No. 2 requests reservation of a bandwidth of 2 Gbps with a requested delay time of 325 μs for communication on a communication path using the ONU 2-2. Resource reservation request No. 3 requests reservation of a bandwidth of 3 Gbps with a requested delay time of 325 μs for communication on a communication path using the ONU 2-1. Resource reservation request No. 4 requests reservation of a bandwidth of 4 Gbps without setting of a requested delay time on the communication path using the ONU 2-1. Note that, while a bandwidth is expressed in a transmission rate herein, what is actually allocated by the OLT 1 is a transmission time slot (transmission start timing and length) in each allocation period. The entire length of time to be used for transmission of data from ONUs 2 in an allocation period is allocated to a single ONU 2, in which case the allocated length of time corresponds to the maximum rate of transmission from the ONU 2 to the OLT 1. Assuming that this maximum rate of transmission rate is 10 Gbps, and the above length of time is equally allocated to two ONUs 2, the two ONUs 2 each can perform transmission at 5 Gbps. As described above, because allocation of transmission time slots can be converted into allocation of rates of transmission, allocation of transmission time slots is also referred to as allocation of bandwidths.

FIG. 9 is a table illustrating an example of the classification information according to the present embodiment. The slice managing unit 11 classifies received resource reservation requests into delay classes by using the guaranteed delay time for each delay class of each ONU 2 illustrated in FIG. 6.

For example, because the port pair of resource reservation request No. 1 is (2-1, 1), the slice managing unit 11 refers to the guaranteed delay time for each delay class of the ONU 2-1. The guaranteed delay times for the delay classes of the ONU 2-1 are 100 μs for delay class 1 and 300 μs for delay class 2 in the example illustrated in FIG. 6. Because the requested delay time of resource reservation request No. 1 is 100 μs, resource reservation request No. 1 is classified as delay class 1, which is a delay class that can guarantee the requested delay time.

In addition, because the port pair of resource reservation request No. 2 is (2-2, 1), the slice managing unit 11 refers to the guaranteed delay time for each delay class of the ONU 2-2. The guaranteed delay times for the delay classes of the ONU 2-2 are 150 μs for delay class 1 and 350 μs for delay class 2 in the example illustrated in FIG. 6. Because the requested delay time of resource reservation request No. 2 is 325 μs, resource reservation request No. 2 is classified as delay class 1, which can guarantee the requested delay time.

In addition, because the port pair of resource reservation request No. 3 is (2-1, 1), the slice managing unit 11 refers to the guaranteed delay time for each delay class of the ONU 2-1. Because the requested delay time of resource reservation request No. 3 is 325 μs, the resource reservation request No. 3 is classified as delay class 2 associated with the maximum allowable delay time among the delay classes that can guarantee the requested delay time. This means that each resource reservation request is classified as a delay class associated with the maximum allowable delay time among the delay classes that can guarantee the requested delay time.

Reference is made back to FIG. 5. Upon updating the classification information in step S5, the slice managing unit 11 determines the bandwidth allocation method and a bandwidth to be allocated for each resource reservation request (step S6). As described above, each delay class is associated with an allocation method. Thus, the slice managing unit 11 can determine the allocation method on the basis of the delay class of each resource reservation request. In addition, the slice managing unit 11 determines, for each resource reservation request, a bandwidth to be allocated through the determined allocation method. In the fixed allocation, as described above, a bandwidth per allocation period is fixed. In the fixed allocation, thus, the slice managing unit 11 determines a fixed allocation bandwidth. In the status report allocation, the slice managing unit 11 determines a maximum allocation bandwidth, which is an upper limit of the bandwidth to be allocated in the status report allocation. In the best effort allocation, the slice managing unit 11 determines a requested bandwidth to be allocated, which is a requested bandwidth. Specifically, the slice managing unit 11 determine that each of a fixed allocation bandwidth in the fixed allocation, a maximum allocation bandwidth in the status report allocation, and a requested bandwidth to be allocated in the best effort allocation is a requested bandwidth of a resource reservation request.

Assume that the fixed allocation and the status report allocation are used in first and second ones of three successive allocation periods without bandwidths being left in the first and second periods. In this case, given that the best effort allocation allows a delay, the maximum bandwidth within the requested bandwidth is allocated in a third period of the three allocation periods if there is a bandwidth left in the third period. Assume that the maximum allocation bandwidth as discussed above is set in the case of the status report allocation. In this case, a bandwidth up to a necessary amount is allocated beyond the maximum allocation bandwidth if there is an excess bandwidth for the allocation of such a necessary amount. In the absence of such excess bandwidth, however, a bandwidth up to the maximum allocation bandwidth is allocated. This means that the bandwidth is shared between the status report allocation and the best effort allocation.

The slice managing unit 11 outputs, to the bandwidth allocating unit 12 and the resource information generating unit 15, an ONU 2 to which a bandwidth is to be allocated, a delay class, a requested bandwidth, a bandwidth allocation method, and a bandwidth to be allocated, for each resource reservation information. In other words, the slice managing unit 11 outputs, to the bandwidth allocating unit 12 and the resource information generating unit 15, the classification information, the bandwidth allocation method, and the bandwidth to be allocated. After step S6, the slice managing unit 11 performs the processes from step S2 again. Note that, in step S6, the slice managing unit 11 may output, to the bandwidth allocating unit 12 and the resource information generating unit 15, information relating to all valid resource reservation requests as illustrated in FIG. 9, or may output information corresponding to newly received resource reservation requests alone thereto.

If the allocation period is not changed (step S2, No), the slice managing unit 11 proceeds to the process in step S4. If no resource reservation request is received (step S4, No), the slice managing unit 11 performs the processes from step S2 again. Note that, after step S1, the slice managing unit 11 performs the determination in step S2 in a predetermined process period, thereby performing processes depending on the update of the allocation period and the presence or absence of receipt of a resource reservation request. The procedures illustrated in FIG. 5 are an example, and specific procedures are not limited to those illustrated in FIG. 5 as long as equivalent processes can be performed. For example, the determination in step S4 may be performed before step S2, in which case, upon receipt of a resource reservation request, the determination is made as to whether or not the allocation period has changed from that when a previous resource reservation request was received, and step S3 is performed if the allocation period has been updated.

As described above, the slice managing unit 11 calculates a guaranteed delay time associated with each of a plurality of allocation methods, and holds the guaranteed delay time associated with each of allocation methods. In addition, the slice managing unit 11 receives a resource reservation request from the controller 4, and determines the allocation method associated with the resource reservation request, on the basis of the requested delay time included in the resource reservation request and the guaranteed delay time for each of the allocation methods. As described above, classifying a resource reservation request in accordance with the delay class corresponds to determining the allocation method associated with a resource reservation request.

Through the processes described above, the slice managing unit 11 can notify the bandwidth allocating unit 12 and the resource information generating unit 15 of an ONU 2 to which a bandwidth is to be allocated, a delay class, a requested bandwidth, a bandwidth allocation method, and a bandwidth to be allocated, for each resource reservation request. Alternatively, because a delay class is associated with an allocation method, the slice managing unit 11 may notify the bandwidth allocating unit 12 and the resource information generating unit 15 of either one of the delay class and the allocation method. Although not illustrated, a resource reservation request includes slice identification information for identifying a slice, that is, a virtual network. As a result, when the controller 4 makes a request for deleting or changing communication resources for a slice associated with a resource reservation request, the request can be reflected in the classification information. The slice managing unit 11 may add the slice identification information to the classification information.

The bandwidth allocating unit 12 performs bandwidth allocation slice-by-slice in accordance with the bandwidth allocation method of which the slice managing unit 11 notifies the bandwidth allocating unit 12. For a slice in the fixed allocation, for example, the bandwidth allocating unit 12 allocates a transmission time slot corresponding to a fixed bandwidth allocation amount per allocation period of which the slice managing unit 11 notifies the bandwidth allocating unit 12. For a slice in the status report allocation, the bandwidth allocating unit 12 allocates a transmission time slot per allocation period to an ONU 2 associated with the slice, on the basis of an amount necessary for transmission of data from the ONU 2 in the slice. When the necessary amount is smaller than the maximum allocation bandwidth of which the slice managing unit 11 notifies the bandwidth allocating unit 12, the bandwidth allocated per allocation period to the slice is the necessary amount, and when the necessary amount is equal to or larger than the maximum allocation bandwidth, the bandwidth allocated per allocation period to the slice is the maximum allocation bandwidth. For a slice in the best effort allocation, after allocating bandwidths, every allocation period, to slices other than the slice in the best effort allocation, the bandwidth allocating unit 12 allocates an excess bandwidth, which is a remaining bandwidth, to the slice. In this case, when the excess bandwidth is equal to or larger than the requested bandwidth of which the slice managing unit 11 notifies the bandwidth allocating unit 12, the bandwidth allocated to the slice is the requested bandwidth, and when the excess bandwidth is smaller than the requested bandwidth, the bandwidth allocated to the slice is the excess bandwidth. In a case where a plurality of slices in the best effort allocation are present, the excess bandwidth is divided for the slices.

Next, the operation of the resource information generating unit 15 will be described. The resource information generating unit 15 holds, as abstract resource information that is resource information, available bandwidths for each of the methods of allocation to a plurality of ONUs 2. On the basis of information input from the slice managing unit 11, i.e., an allocation method associated with a resource reservation request and a requested bandwidth included in the resource reservation request, the resource information generating unit 15 calculates the available bandwidth for an ONU 2 in the allocation method associated with the resource reservation request. The resource information generating unit 15 then updates the abstract resource information with the calculated available bandwidth, and transmits the abstract resource information to the controller 4.

Figure 10:
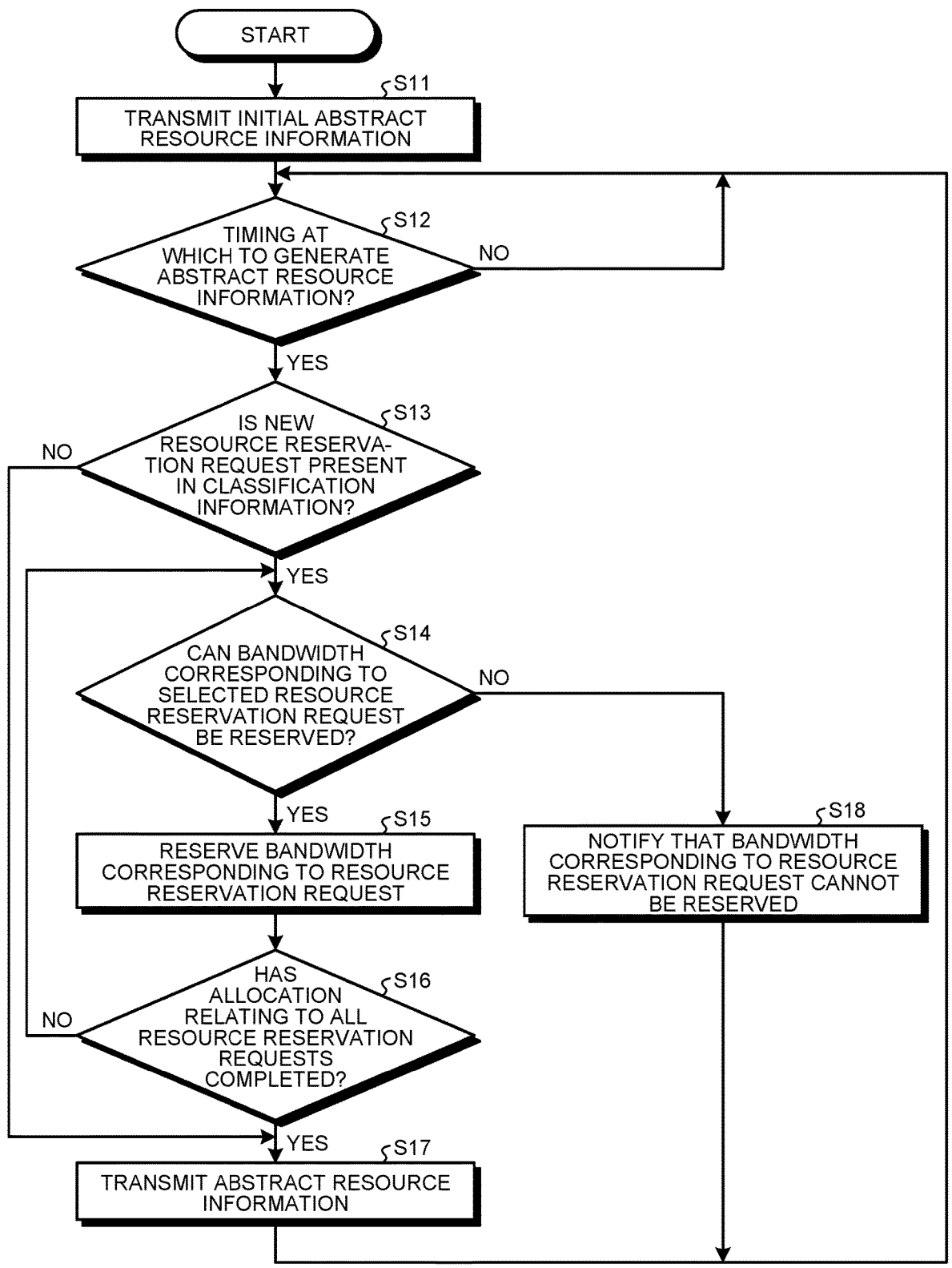
FIG. 10 is a flowchart illustrating an example of procedures performed by a resource information generating unit according to the embodiment.

FIG. 10 is a flowchart illustrating an example of procedures performed by the resource information generating unit 15 according to the present embodiment. After activation of the OLT 1, the resource information generating unit 15 transmits an initial abstract resource information, which is an initial value of the abstract resource information, to the controller 4 (step S11). FIG. 11 is a table illustrating an example of the abstract resource information according to the present embodiment. As illustrated in FIG. 11, the abstract resource information includes, for each port pair, guaranteed delay times and available bandwidths for the delay classes. The initial abstract resource information is abstract resource information in which initial values, that is, values before reception of a resource reservation request are stored as the available bandwidths. The guaranteed delay times are determined after measurement of RTTs after activation of the OLT 1 as described above.

In delay class 1, that is, in the fixed allocation, bandwidths are fixedly allocated regardless of the storage amounts of transmission data in the ONUs 2. Each ONU 2 includes a buffer for the fixed allocation, and transmission data associated with the fixed allocation are stored in the buffer for the fixed allocation. Thus, the maximum amount of transmission data that an ONU 2 transmits over one allocation period depends on the size of the buffer for the fixed allocation. Before reception of a resource reservation request, the entire maximum amount of transmission data is available, and an initial value of a used bandwidth associated with the fixed allocation is a bandwidth corresponding to the size of the buffer for the fixed allocation. In delay class 2 and delay class 3, a bandwidth corresponding to the maximum uplink transmission rate of an ONU 2 is the initial value of a used bandwidth. Note that, as described above, since the description herein is based on the assumption that the PON system 100 is 10G-EPON, the maximum uplink transmission rate of an ONU 2 is 10 Gbps. Although a bandwidth usable for transmission of user data in 10G-EPON is practically smaller than 10 Gbps because of presence of control data and forward error correction (FEC) field, and the like, an example in which the ONU 2-1 and the ONU 2-2 share a bandwidth of 10 Gbps will be described herein on the assumption that the control data, FECs, and the like are negligible for simplicity of the description of the example.

As illustrated in FIG. 11, in delay class 2, the available bandwidth of each of the port pairs is 10 Gbps, for example. Thus, it appears that available bandwidths of 20 Gbps in total are present. In fact, however, because 10 Gbps is shared by the ONU 2-1 and the ONU 2-2, both of the ONU 2-1 and the ONU 2-2 cannot perform uplink communication at 10 Gbps. Either the ONU 2-1 or the ONU 2-2 alone can use up to 10 Gbps, and the initial values are therefore set to the values illustrated in FIG. 11. The abstract resource information is updated when a resource reservation request is received, and is also updated when the allocation period is changed and when an allocation amount calculation algorithm of the DBA in bandwidth allocation is changed.

Reference is made back to FIG. 10. Subsequently, the resource information generating unit 15 determines whether or not a timing at which to generate abstract resource information arrives (step S12). The abstract resource information is transmitted each time the abstract resource information is changed. Thus, the timing at which to generate abstract resource information is a timing at which the abstract resource information is changed. Alternatively, the abstract resource information may be transmitted to the controller 4 in response to a request by the controller 4 or periodically even when the abstract resource information is not updated. In such a case, a timing at which a request by the controller 4 is received or a periodic timing is also the timing at which to generate abstract resource information.

If the timing at which to generate abstract resource information arrives (step S12 Yes), the resource information generating unit 15 determines whether or not a new resource reservation request is present in the classification information (step S13). Specifically, in step S13, the resource information generating unit 15 determines whether or not the classification information relating to a new resource reservation request or the like has been received from the slice managing unit 11 after previous abstract resource information was received. If the timing at which to generate abstract resource information does not arrive (step S12, No), the resource information generating unit 15 repeats step S12.

If a new resource reservation request is present in the classification information (step 313, Yes), the resource information generating unit 15 determines whether or not a bandwidth corresponding to a selected resource reservation request can be reserved (step 314). Note that, when a plurality of new resource reservation requests are present, the resource information generating unit 15 selects, from among the resource reservation requests not yet processed in step S14, an earliest received resource reservation request to be processed in step S14. When there has been a change that affects calculation of an available bandwidth, such as a change in the allocation period or a change in the allocation amount calculation algorithm of the DBA in bandwidth allocation after a previous abstract resource information was generated, the process in step 314 is performed on the basis of the change. For example, when the allocation period has been changed, the guaranteed delay times for each delay class illustrated in FIG. 6 are changed. Upon detecting a change in the allocation period, a change in the allocation amount calculation algorithm of the DBA in bandwidth allocation, or the like as a result of notification from the bandwidth allocating unit 12, the slice managing unit 11 performs the processes illustrated in FIG. 5 again to classify the resource reservation requests. As a result, the classification information is changed.

In step S14, specifically, the resource information generating unit 15 determines, on the basis of the held abstract resource information and the selected new resource reservation request, whether or not a bandwidth corresponding to the selected resource reservation request can be reserved. A new resource reservation request is a resource reservation request that is received after a previous abstract resource information was generated. Resource reservation information having classification information changed as the classification information is updated as a result of a change in the allocation period or the like is contained in a new resource reservation request as described above.

For example, in a case where a resource reservation request is first received after initial abstract resource information was transmitted, the resource reservation request is classified by the slice managing unit 11 described above, and classification information, an allocation method, and an allocation amount are input to the resource information generating unit 15. When an available bandwidth in the initial abstract resource information for a delay class of an ONU 2 corresponding to the resource reservation request is equal to or larger than an allocation bandwidth of which the slice managing unit 11 notifies the resource information generating unit 15, the bandwidth corresponding to the resource reservation request can be reserved. For example, in a case where the initial abstract resource information is that illustrated in FIG. 11 and a received resource reservation request that was first received is resource reservation request No. 1 illustrated in FIG. 7, the available bandwidth associated with delay class 1 of the ONU 2-1 is 3 Gbps, the allocation bandwidth of which the slice managing unit 11 notifies the resource information generating unit 15 is 1 Gbps, and the bandwidth corresponding to the resource reservation request No. 1 can therefore be reserved. In contrast, for example, in a case where a resource reservation request associated with delay class 1 of the ONU 2-1 and having the requested bandwidth of 3 Gbps is received after resource reservation request No. 1 was received, the bandwidth corresponding to the resource reservation request cannot be reserved.

If the bandwidth corresponding to the selected resource reservation request can be reserved (step S14, Yes), the resource information generating unit 15 reserves the bandwidth corresponding to the resource reservation request (step S15). Thus, the resource information generating unit 15 allocates a bandwidth to the resource reservation request, and reflects the result of allocating the bandwidth in the held abstract resource information. As a result, the resource information generating unit 15 can calculate an available bandwidth after reservation of the bandwidth corresponding to the resource reservation request. The resource information generating unit 15 updates the held abstract resource information with the calculated available bandwidth. Details of updating a used bandwidth in response to a resource reservation request will be described later.

The resource information generating unit 15 determines whether or not allocation relating to all the resource reservation requests has been completed (step S16) Note that all the resource reservation requests refers to all the resource reservation requests that are newly received as described with reference to step S13. If allocation relating to all the resource reservation requests has been completed (step S16, Yes), the resource information generating unit 15 transmits the abstract resource information to the controller 4 (step S17), and repeats the processes from step S12. In a case of No in step S13, the resource information generating unit 15 transmits the abstract resource information to the controller 4 (step S17), and repeats the processes from step S12. Note that, each time there has been a change that affects calculation of an available bandwidth, such as a change in the allocation period or a change in the allocation amount calculation algorithm of the DBA in bandwidth allocation, the resource information generating unit 15 updates abstract resource information on the basis of the change. Thus, when the determination in step S13 is No and the process moves to step S17, the abstract resource information is not updated on the basis of the resource reservation request, but when there has been a change as a result of a change in the allocation period or the like, the abstract resource information in which the change is reflected is transmitted in step S17.

If it is determined in step S16 that a resource reservation request for which allocation has not been completed is present (step S16, No), the resource information generating unit 15 changes the resource reservation request that is to be selected, and repeats the processes from step S14.

If the bandwidth corresponding to the selected resource reservation request cannot be reserved in step S14 (step S14, No), the resource information generating unit 15 notifies the controller 4 that the bandwidth corresponding to the resource reservation request cannot be reserved (step S18). In other words, the resource information generating unit 15 transmits, to the controller 4, a response indicating that resource reservation cannot be performed. After step S18, the resource information generating unit 15 repeats the processes from step S12.

Upon receiving a slice request, the controller 4 determines, on the basis of the abstract resource information received from the OLT 1 and the resource information received from the layer 2 switches 3-1 to 3-*m*, whether or not a resource corresponding to the slice request is present. A slice request, which is a resource request indicating a resource requested for communication from an end point to another in the communication system 200, includes a bandwidth to be reserved, a requested guaranteed delay time, and the like. When the resource corresponding to the slice request is present, the controller 4 requests the OLT 1, the layer 2 switches 3-1 to 3-*m*, and the like in the communication system 200 to reserve the resource. For example, the controller 4 may perform such process as conducting path search in a network, and then generating resource information in units of paths from resource information on nodes on the path or generating resource information between end points in the network with the path hidden. As described above, the controller 4 performs such process as allocation of resources to individual slices on the basis of information relating to resources received from devices in the communication system 200. Typically, a PON system performs dynamic bandwidth allocation and changes the allocation method. For this reason, it is difficult for the controller 4 to manage resources in a typical PON system, and it is not easy to allocate resources to individual slices in view of guaranteed delay times and the like in the PON system. In contrast, the OLT 1 according to the present embodiment transmits, to the controller 4, abstract resource information including such parameters as guaranteed delay times and an available bandwidth. Thus, the controller 4 can easily perform allocation in accordance with, for example, guaranteed delay times and the bandwidths requested for individual slices.

Figure 12:
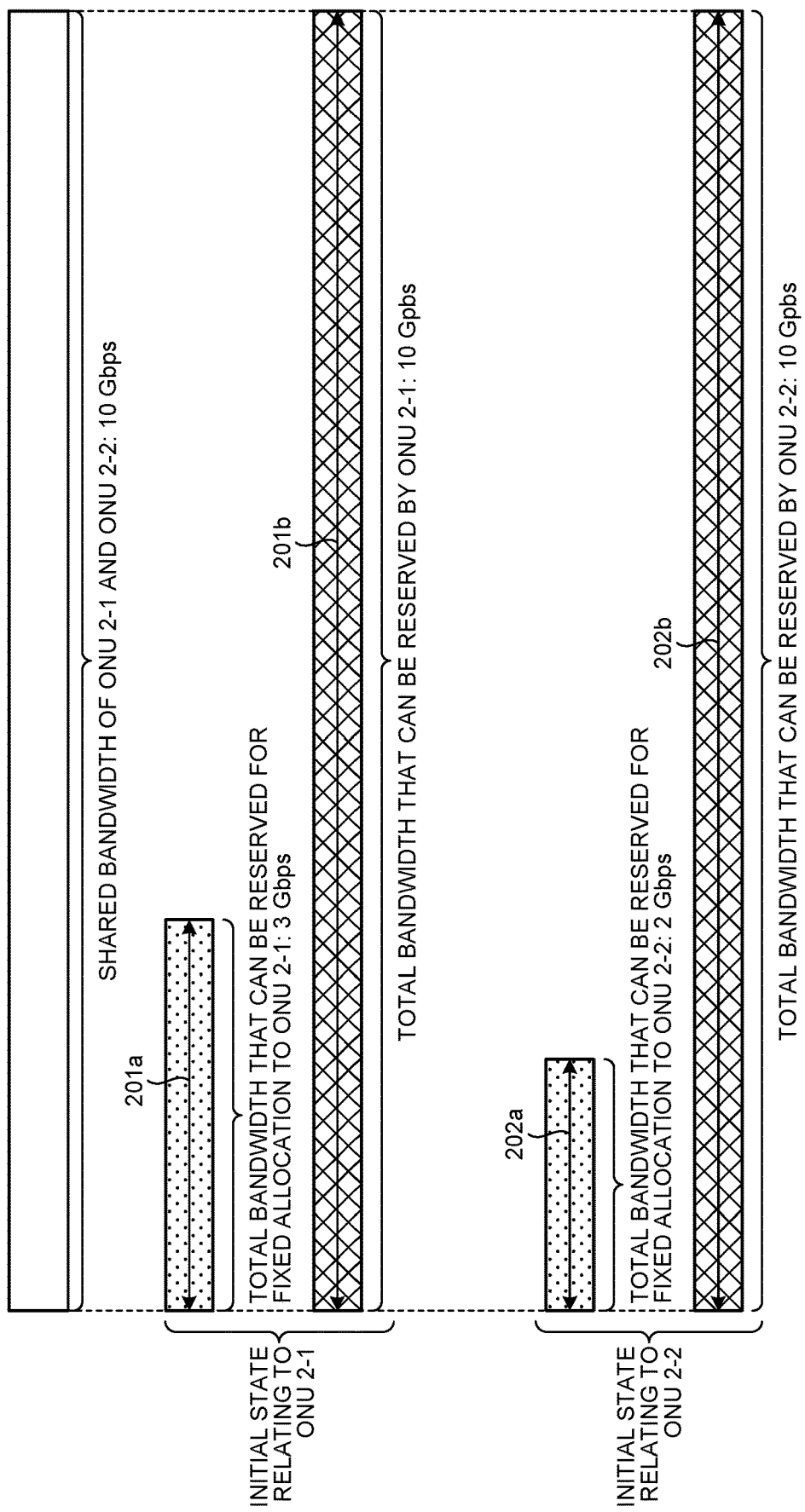
FIG. 12 is a diagram illustrating a state of communication resources before a resource reservation request is input according to the embodiment.

Next, reservation of a bandwidth corresponding to a resource reservation request and calculation of an available bandwidth will be described. FIG. 12 is a diagram illustrating a state of communication resources before a resource reservation request is input according to the present embodiment. A first row illustrates a shared bandwidth that is shared for use by the ONU 2-1 and the ONU 2-2. As described above, the shared bandwidth is 10 Gbps herein. A second row illustrates a state of bandwidths relating to delay class 1 of the ONU 2-1, and a third row illustrates a state of bandwidths relating to all the delay classes of the ONU 2-1. Because the state in FIG. 12 is that before reception of a resource reservation request, an available bandwidth 201*a* associated with delay class 1, that is, the fixed allocation for the ONU 2-1 is equal to a total bandwidth of 3 Gbps that can be reserved for the fixed allocation to the ONU 2-1 as illustrated on the second row. The total bandwidth that can be reserved for the fixed allocation to the ONU 2-1 is a bandwidth calculated from the size of the buffer for the fixed allocation described above and corresponds to the initial value of the available bandwidth illustrated in FIG. 11. As illustrated on the third row, an available bandwidth 201*b* associated with all the delay classes of the ONU 2-1 is equal to a total bandwidth of 10 Gbps that can be reserved for allocation to the ONU 2-1. While the available bandwidth in delay classes 2 and 3 is the available bandwidth 201*b* relating to all the delay classes illustrated on the third row of FIG. 12, the available bandwidth in delay class 1 is the smaller of the available bandwidths 201a, 201b, the bandwidth 201a being an available bandwidth specific to the fixed allocation and illustrated on the second row, the bandwidth 201b relating to all the delay classes. Thus, in the state illustrated in FIG. 12, the available bandwidth in delay class 1 of the ONU 2-1 is 3 Gbps, and the available bandwidth in delay classes 2 and 3 of the ONU 2-1 is 10 Gbps.

Similarly, in FIG. 12, a fourth row illustrates a state of bandwidths relating to delay class 1 of the ONU 2-2, and a fifth row illustrates a state of bandwidths relating to all the delay classes of the ONU 2-2. As illustrated on the fourth row, an available bandwidth 202a associated with delay class 1 of the ONU 2-2 is equal to a total bandwidth of 2 Gbps that can be reserved or the fixed allocation to the ONU 2-2. As illustrated on the fifth row, an available bandwidth 202b relating to all the delay classes of the ONU 2-2 is equal to a total bandwidth of 10 Gbps that can be reserved for allocation to the ONU 2-2. When the allocation method associated with a resource reservation request is the fixed allocation, the resource information generating unit 15 updates the available bandwidth by subtracting, from the available bandwidth, a requested bandwidth included in the resource reservation request, the available bandwidth corresponding to the fixed bandwidth for the ONU 2 associated with the resource reservation request before the bandwidth corresponding to the resource reservation request is reserved. In the state illustrated in FIG. 12, the available bandwidth in delay class 1 of the ONU 2-2 is 2 Gbps, and the available bandwidth in delay classes 2 and 3 of the ONU 2-2 is 10 Gbps.

Figure 13:
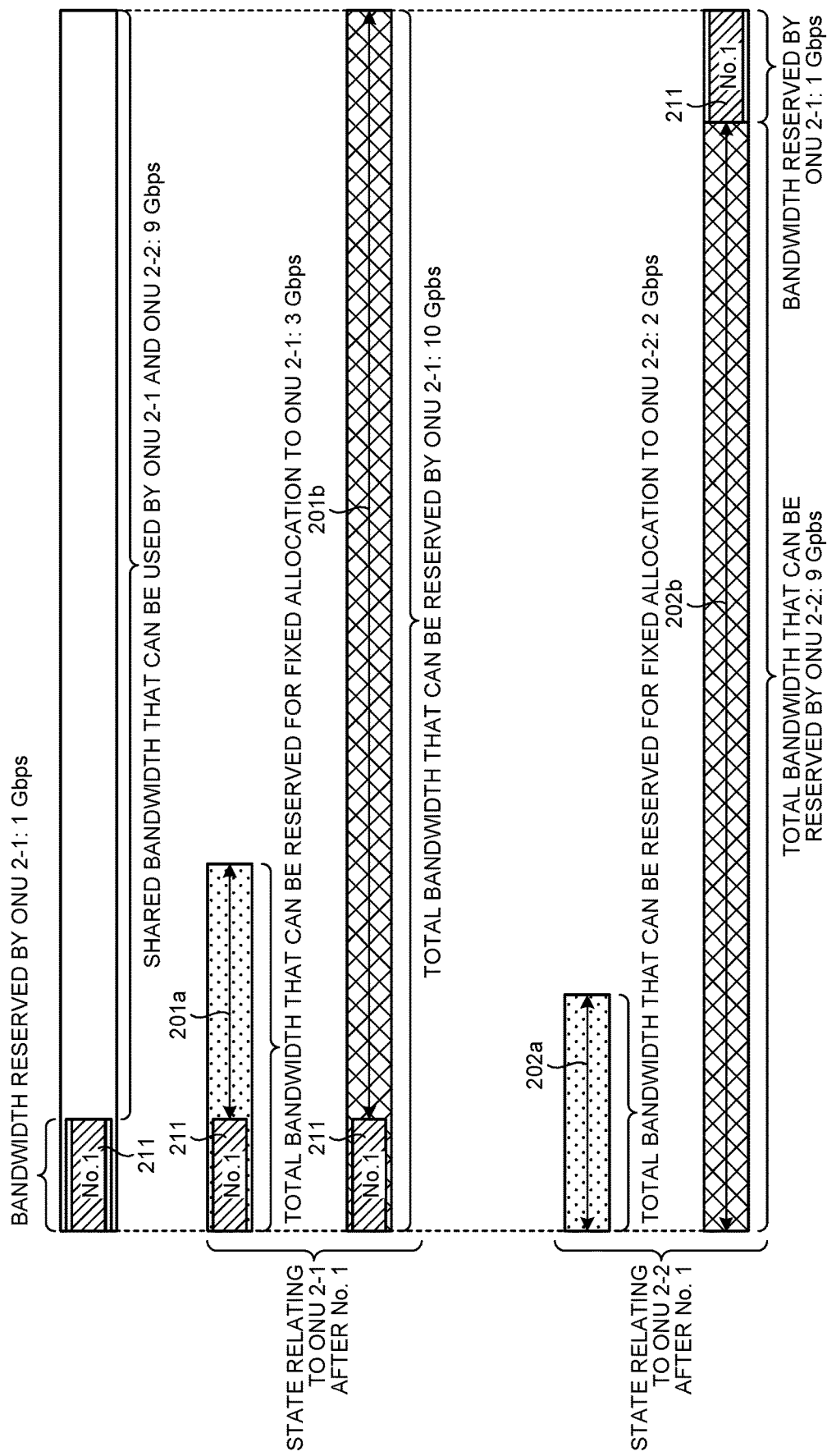
FIG. 13 is a diagram illustrating a state of communication resources after resource reservation request No. 1 illustrated in FIG. 7 is received.

FIG. 13 is a diagram illustrating a state of communication resources after resource reservation request No. 1 illustrated in FIG. 7 is received. In FIG. 13, resource reservation request No. 1 is abbreviated as No. 1. FIG. 13 illustrates a state following the state in FIG. 12. In the state of FIG. 13, the OLT 1 receives resource reservation request No. 1 illustrated in FIG. 7 and reserves a bandwidth corresponding to resource reservation request No. 1. Resource reservation request No. 1 is classified as delay class 1, that is, the fixed allocation as illustrated in FIG. 9. Reservation of the bandwidth requested by resource reservation request No. 1 requires allocation of a fixed allocation bandwidth of 1 Gbps for the ONU 2-1. A first row in FIG. 13 indicates that, as a result of reservation of a reserved bandwidth 211 of 1 Gbps for the ONU 2-1, the available shared bandwidth becomes 9 Gbps. A second row indicates that, as reservation of the reserved bandwidth 211 is reflected in the total bandwidth that can be reserved for fixed allocation to the ONU 2-1, the available bandwidth 201a is decreased to 2 Gbps. A third row indicates that, as reservation of the reserved bandwidth 211 of 1 Gbps is reflected in the total bandwidth that can be reserved by the ONU 2-1, the available bandwidth 201b relating to all the delay classes is decreased to 9 Gbps. In this state, for the ONU 2-1, the available bandwidths in delay classes 1, 2, and 3 are 2 Gbps, 9 Gbps, and 9 Gbps, respectively. The total bandwidth that can be reserved by the ONU 2-1 remains 10 Gbps.

As illustrated on the fourth row in FIG. 13, the available bandwidth 202a associated with delay class 1 of the ONU 2-2 has not changed from the state in FIG. 12. In contrast, as illustrated on the fifth row, the reservation of the reserved bandwidth 211 of 1 Gbps for the ONU 2-1 is reflected in the shared bandwidth. As a result, the available bandwidth 202b relating to all the delay classes of the ONU 2-2 is decreased to 9 Gbps. In this state, for the ONU 2-2, the available bandwidths in delay classes 1, 2, and 3 are 2 Gbps, 9 Gbps, and 9 Gbps, respectively. As a result of reservation of 1 Gbps by the ONU 2-1, the total bandwidth that can be reserved by the ONU 2-2 is decreased to 9 Gbps.

Figure 14:
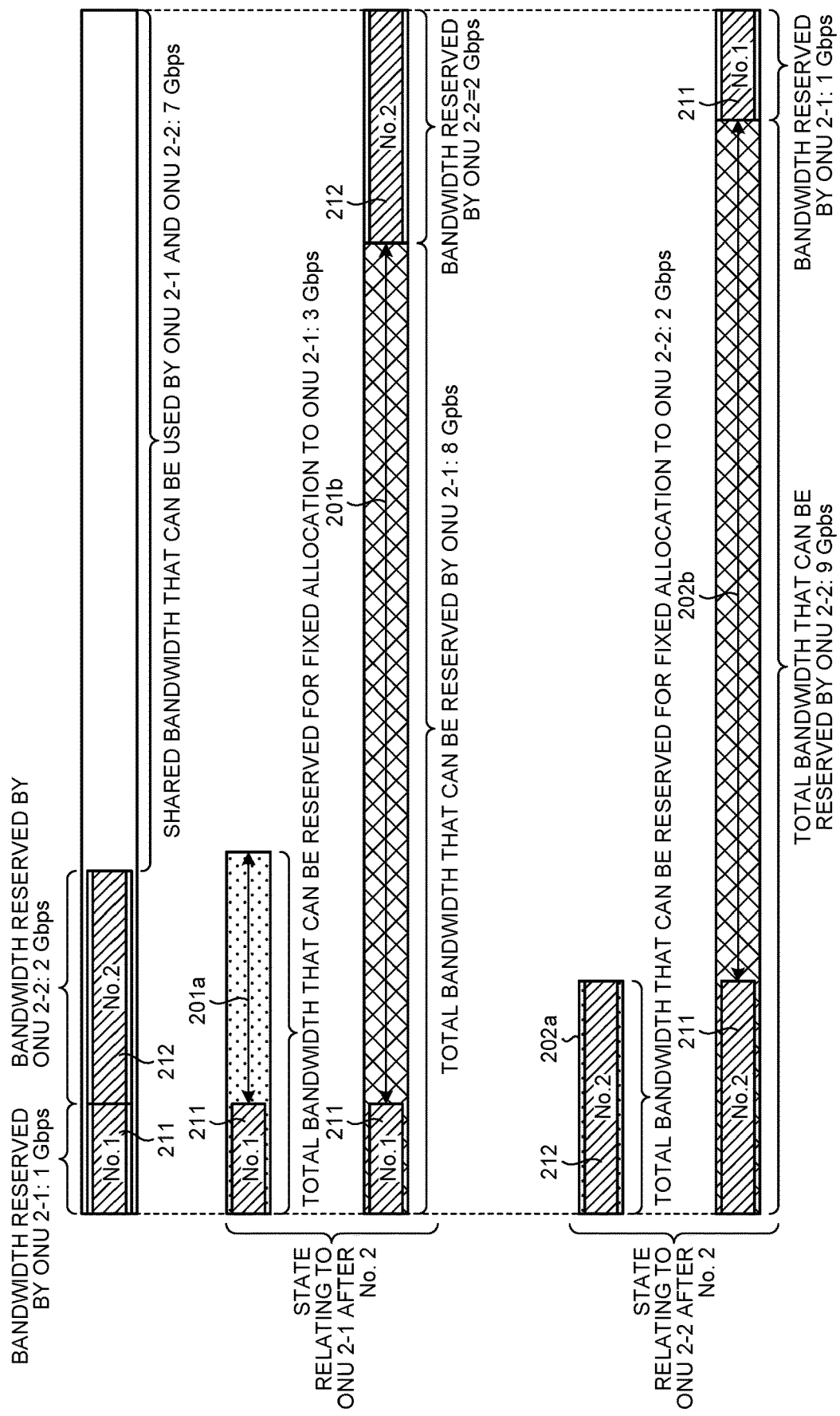
FIG. 14 is a diagram illustrating a state of communication resources after resource reservation request No. 2 illustrated in FIG. 7 is received.

FIG. 14 is a diagram illustrating a state of communication resources after resource reservation request No. 2 illustrated in FIG. 7 is received. In FIG. 14, resource reservation request No. 2 is abbreviated as No. 2. FIG. 14 illustrates a state following the state in FIG. 13. In the state of FIG. 14, the OLT 1 receives resource reservation request No. 2 illustrated in FIG. 7 and reserves a bandwidth corresponding to resource reservation request No. 2. Resource reservation request No. 2 is classified as delay class 1, that is, the fixed allocation as illustrated in FIG. 9. Reservation of the bandwidth requested by resource reservation request No. 2 requires allocation of a fixed allocation bandwidth of 2 Gbps for the ONU 2-2. A first row in FIG. 14 indicates that, because a reserved bandwidth 212 of 2 Gbps is newly reserved for the ONU 2-2, the available shared bandwidth becomes 7 Gbps. A second row indicates that the available bandwidth 201a in delay class 1 of ONU 2-1 has not changed from the state in FIG. 13. A third row indicates that, because 2 Gbps is newly reserved for the ONU 2-2 in the total bandwidth that can be reserved by the ONU 2-1, the available bandwidth 201b relating to all delay classes is decreased to 7 Gbps. In this state, for the ONU 2-1, the available bandwidths in delay classes 1, 2, and 3 are 2 Gbps, 7 Gbps, and 7 Gbps, respectively. As a result of reservation of 2 Gbps by the ONU 2-2, the total bandwidth that can be reserved by the ONU 2-1 is decreased to 8 Gbps.

A fourth row in FIG. 14 indicates that, as a result of reservation of the reserved bandwidth 212 of 2 Gbps for the ONU 2-2, the available bandwidth 202a associated with delay class 1 of the ONU 2-2 becomes 0 Gbps. In addition, as illustrated on a fifth row, because the reserved bandwidth 212 of 2 Gbps is newly reserved for the ONU 2-2 in the shared bandwidth, the available bandwidth 202b relating to all the delay classes of the ONU 2-2 is decreased to 7 Gbps. In this state, for the ONU 2-2, the available bandwidths in delay classes 1, 2, and 3 are 0 Gbps, 7 Gbps, and 7 Gbps, respectively. Thus, even if a resource reservation request classified as delay class 1 for the ONU 2-2 is received from this point, a bandwidth corresponding to the resource reservation request cannot be reserved. The total bandwidth that can be reserved by the ONU 2-2 remains 9 Gbps.

Figure 15:
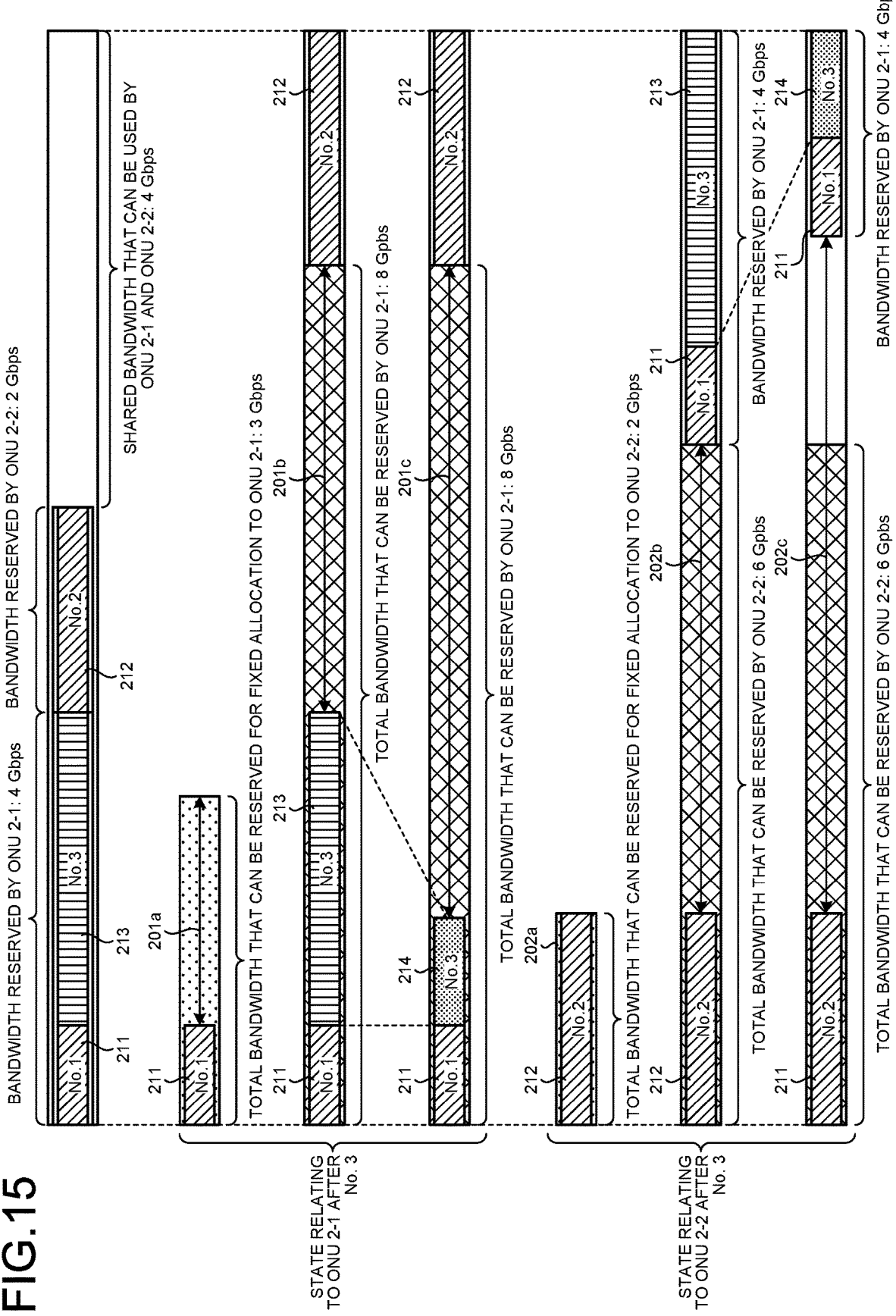
FIG. 15 is a diagram illustrating a state of communication resources after resource reservation request No. 3 illustrated in FIG. 7 is received.

FIG. 15 is a diagram illustrating a state of communication resources after resource reservation request No. 3 illustrated in FIG. 7 is received. In FIG. 15, resource reservation request No. 3 is abbreviated as No. 3. FIG. 15 illustrates a state following the state in FIG. 14. In the state of FIG. 15, the OLT 1 receives resource reservation request No. 3 illustrated in FIG. 7 and reserves a bandwidth corresponding to resource reservation request No. 3. Resource reservation request No. 3 is classified as delay class 2, that is, the status report allocation as illustrated in FIG. 9. Reservation of the bandwidth requested by resource reservation request No. 3 requires a bandwidth of 3 Gbps for the status report allocation for the ONU 2-1.

When the allocation method associated with a resource reservation request is the status report allocation, the resource information generating unit 15 updates the available bandwidth by subtracting, from the available bandwidth, a requested bandwidth included in the resource reservation request, the available bandwidth being associated with the status report allocation for the ONU 2 associated with the resource reservation request before the bandwidth corresponding to the resource reservation request is reserved. A first row in FIG. 15 indicates that, because a reserved bandwidth 213 of 3 Gbps is newly reserved for the ONU 2-2, the available shared bandwidth becomes 4 Gbps. A second row indicates that the available bandwidth 201a in delay class 1 of ONU 2-1 has not changed from the state in FIG. 13. A third row indicates that, because 3 Gbps is newly reserved for the ONU 2-1 in the total bandwidth that can be reserved by the ONU 2-1, the available bandwidth 201b relating to all the delay classes is decreased to 4 Gbps. In this state, for the ONU 2-1, the available bandwidths in delay classes 1, 2, and 3 are 2 Gbps, 4 Gbps, and 4 Gbps, respectively. The total bandwidth that can be reserved by the ONU 2-2 remains 8 Gbps.

In addition, a fourth row illustrates a state in which the allocation amount that is actually allocated to the ONU 2-1 by the bandwidth allocating unit 12 is reflected. Because resource reservation request No. 3 corresponds to the status report allocation, in some case, a bandwidth allocated by the bandwidth allocating unit 12 in accordance with a necessary amount of an ONU 2 is smaller than the bandwidth reserved in accordance with resource reservation request No. 3. The fourth row in FIG. 15 indicates that an allocation amount 214 that is actually allocated by the bandwidth allocating unit 12 to a slice associated with resource reservation request No. 3 is 1 Gbps. An available bandwidth 201c calculated using the actually allocated allocation amount 214 instead of the reserved bandwidth 213 described above is 6 Gbps. In the case of the status report allocation, in some case, a bandwidth smaller than a reserved bandwidth is allocated as discussed above. The resource information generating unit 15 receives an allocation amount for each slice from the bandwidth allocating unit 12, and thus can calculate an available bandwidth reflecting an actual allocation amount. The difference of 2 Gbps between the bandwidth reserved for the status report allocation and the actual allocation amount in the status report allocation can be used for the best effort allocation. Specifically, when the allocation method associated with a resource reservation request is the status report allocation, the resource information generating unit 15 may update the available bandwidth by subtracting, from the available bandwidth, the bandwidth actually allocated by the bandwidth allocating unit 12 to the slice associated with the resource reservation request, the available bandwidth being associated with the best effort allocation for the ONU 2 associated with the resource reservation request before the bandwidth corresponding to the resource reservation request is reserved. When the available bandwidth is calculated reflecting the actual allocation amount, the available bandwidths in delay classes 1, 2, and 3 for the ONU 2-1 are 2 Gbps, 4 Gbps, and 6 Gbps, respectively.

A fifth row in FIG. 15 indicates that the available bandwidth 202a associated with delay class 1 of the ONU 2-2 remains 0 Gbps. In addition, as illustrated on a sixth row, because the reserved bandwidth 213 of 3 Gbps is newly reserved for the ONU 2-2 in the shared bandwidth, the available bandwidth 202b relating to all the delay classes of the ONU 2-2 is decreased to 4 Gbps. In this state, for the ONU 2-2, the available bandwidths in delay classes 1, 2, and 3 are 0 Gbps, 4 Gbps, and 4 Gbps, respectively. A seventh row illustrates an example resulting from calculation using an actually allocated allocation amount 214, in which example an available bandwidth 202c for the ONU 2-2 is 6 Gbps. Thus, when the available bandwidth is calculated reflecting the actual allocation amount, the available bandwidths in delay classes 1, 2, and 3 for the ONU 2-2 are 0 Gbps, 4 Gbps, and 6 Gbps, respectively.

As described above, the OLT 1 according to the present embodiment calculates an available bandwidth for each class of a delay time that can be guaranteed by the PON system 100, reflecting the allocation method of the bandwidth allocating unit 12 in the PON system 100. The OLT 1 then generates abstract resource information, which is resource information in the case where the PON system 100 is regarded as a virtual layer 2 switch, and transmits the abstract resource information to the controller 4. As a result, the controller 4 can easily and accurately manage communication resources by using the PON system 100 as a virtual layer 2 switch without focusing on the internal operation thereof. Typically, a layer 2 switch can transmit port information indicating a link rate at each port. If the PON system 100 is simply regarded as a layer 2 switch and the OLT 1 transmits only port information to the controller 4, the controller 4 cannot obtain an overview of complicated resource management in the PON system 100. This means that receiving the port information alone from the OLT 1 does not enable the controller 4 to allocate communication resource for providing requested communication services to slices in view of guaranteed delay times and the like. In the present embodiment, because the OLT 1 transmits abstract resource information including such parameters as guaranteed delay times and available bandwidths to the controller 4, the controller 4 can take into consideration guaranteed delay times and the like in the PON system 100 in allocating communication resources to slices, without focusing on the internal operation of the PON system 100.

While the OLT 1 can perform the fixed allocation, the status report allocation, and the best effort allocation as the allocation method in the description above, bandwidth allocation in allocation methods other than these method may be implementable. In this case, the slice managing unit 11 also calculates guaranteed delay times depending on other allocation methods, and assigns a delay class to each of the allocation methods. For example, an allocation method called wireless cooperative DBA may be implementable. In a case where the PON system 100 is applied to mobile fronthaul of a radio base station with a master station controlling timings of transmission of data from wireless terminals and amounts of that data, the wireless cooperative DBA allows the OLT 1 to perform allocation to the ONUs 2 on the basis of control information provided by the master station, the allocation corresponding to the timings of transmission of data of the wireless terminals and the amount of the data. The wireless cooperative DBA is an example of cooperative allocation that allows a device to cooperate with another device in the manner as discussed above. In the case of the cooperative allocation, the bandwidth allocating unit 12 receives information from a control device, the information being managed by the control device and relating to the timings of transmission of data from the ONUs 2 and the amount of that transmission. The information relating to the timings of transmission of data from the ONUs 2 and the amount of that transmission includes the timings of transmission of data from devices at a lower level than the ONUs 2 to the ONUs 2 and the amount of that transmission, for example. The OLT 1 allocates bandwidths to the ONUs 2 on the basis of the received timings of transmission of data and amount of that transmission. The control device is the master station described above in the case of the wireless cooperative DBA. As a result of the use of this allocation method, the transmission waiting time which an ONU 2 needs to have for transmission of data due to the DBA is only the transmission waiting time due to contention with other ONUs 2. In addition, a transmission time longer than that corresponding to the amount of data to be transmitted is not wastefully allocated. Thus, this allocation method corresponds to a delay class in which guaranteed delays are small and bandwidths can be effectively used.

In addition, when the bandwidth allocating unit 12 can perform the best effort allocation and the cooperative allocation, an actual allocation amount may be reflected in calculation of an available bandwidth in a manner similar to the status report allocation described above. Specifically, when the allocation method associated with a resource reservation request is the cooperative allocation, the resource information generating unit 15 may update the available bandwidth by subtracting, from the available bandwidth, the bandwidth actually allocated by the bandwidth allocating unit 12 to the slice associated with the resource reservation request, the available bandwidth being associated with the best effort allocation for the ONU 2 associated with the resource reservation request before the bandwidth corresponding to the resource reservation request is reserved.

In addition, while the number of wavelengths used in optical communication sections between the OLT 1 and the ONUs 2 is one because the PON system 100 is a 10G-EPON system in the example described above, the PON system 100 may be a TWDM-PON system in which the number of wavelengths used in optical communication sections between the OLT 1 and the ONUs 2 is more than one. In NG-PON2, which is an example of TWDM-PON, four wavelengths with a communication rate of 10 Gbps per wavelength are used to achieve a total bandwidth of 40 Gbps. While the OLT 1 can use four wavelengths at the same time, an ONU 2 can use one wavelength at a time, and ONUs 2 that use the same wavelength share a bandwidth of 10 Gbps as in the case of 10G-EPON. An ONU 2 can switch the wavelength to be used, and cannot communicate with the OLT 1 while switching the wavelength. Thus, when the wavelength to be used is actually switched, data transmission and reception between the ONU 2 and the OLT 1 is temporarily interrupted in accordance with the wavelength switching time of the ONU 2. Thus, wavelength switching causes a delay.

When the PON system 100 is a TWDM-PON system, the resource information generating unit 15 obtains, from the bandwidth allocating unit 12, the wavelengths used by the individual ONUs 2 and also manages the wavelengths before generating abstract resource information. The method for reserving a bandwidth for each wavelength, which is basically similar to that in the example of the 10G-EPON system, takes wavelength switching into consideration as follows. Note that the wavelength to be initially used by each ONU 2 may be determined in any manner, and standard procedures such as those defined by ITU-T G.989.3 can be used, for example.

Figure 16:
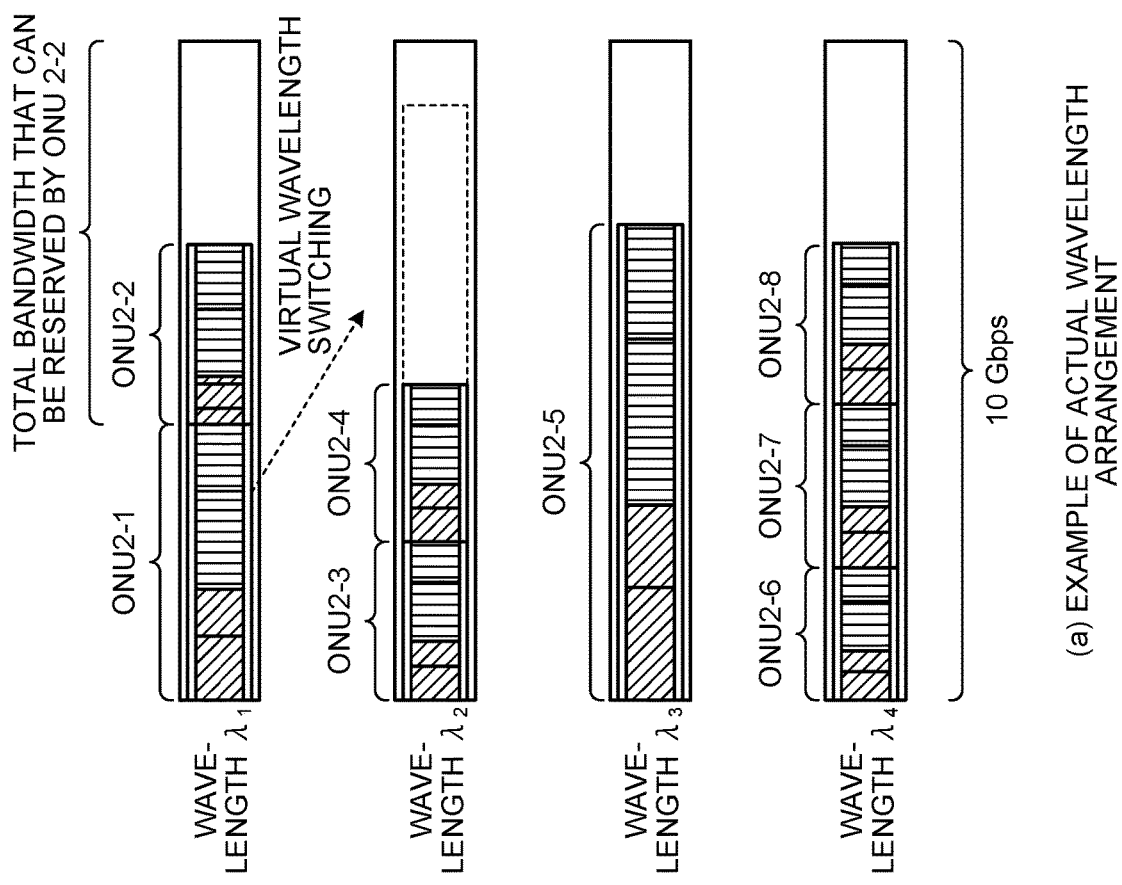
FIG. 16 is a diagram schematically illustrating a method for calculating a total bandwidth that can be reserved for each ONU in a case where a PON system according to the embodiment is an NG-PON2 system.

FIG. 16 is a diagram schematically illustrating a method for calculating a total bandwidth that can be reserved for each ONU 2 in a case where the PON system 100 according to the present embodiment is an NG-PON2 system. In this case, assume that eight ONUs 2, which are ONUs 2-1 to 2-8, are connected to the OLT 1.

FIG. 16 (*a*) illustrates a state in which the ONU 2-1 and the ONU 2-2 use a wavelength $\lambda_1$, the ONU 2-3 and the ONU 2-4 use a wavelength $\lambda_1$, the ONU 2-5 uses a wavelength $\lambda_3$, the ONU 2-6, the ONU 2-7, and the ONU 2-8 use a wavelength $\lambda_4$, and a bandwidth is reserved for each of the ONUs 2 in accordance with a resource reservation request. In this state, a total bandwidth that can be reserved by the ONU 2-2 is a bandwidth obtained by subtracting the bandwidth reserved by the ONU 2-1 sharing the wavelength $\lambda_1$ with the ONU 2-2, from the bandwidth of 10 Gbps per one wavelength, as in the example of 10G-EPON.

FIG. 16 (*b*) illustrates a state in which the wavelength virtually used by the ONU 2-1 is switched from the wavelength $\lambda_1$ to the wavelength $\lambda_2$. In this example, because a total of the bandwidths reserved by the ONU 2-1, the ONU 2-3, and the ONU 2-4 does not exceed 10 Gbps, there is a possibility that the wavelength used by the ONU 2-1 can be switched from the wavelength $\lambda_1$ to the wavelength $\lambda_2$. If the wavelength is changed in this manner, the ONU 2-2 can occupy the wavelength $\lambda_1$, and the total bandwidth that can be reserved by the ONU 2-2 is therefore 10 Gbps.

Thus, when the guaranteed delay times can be satisfied, or is adaptable for all the resource reservation requests for which the ONU 2-1 has reserved bandwidths even if data transmission and reception are temporarily interrupted by switching of the wavelength of the ONU 2-1, a total bandwidth that can be reserved by the ONU 2-2 is 10 Gbps, and the OLT 1 carries out the aforementioned switching of the wavelength. In other words, the resource information generating unit 15 obtains a first bandwidth that is an available bandwidth for a switching candidate device. The switching candidate device is one of the ONUs 2. The first bandwidth is a bandwidth in a case where an optical wavelength to be used by the switching candidate device is switched from a first wavelength to a second wavelength. When the first bandwidth is larger than a second bandwidth that is an available bandwidth before switching the optical wavelength to be used, and when a guaranteed delay time of a slice in which a bandwidth is reserved for the switching candidate device is satisfied, or adaptable even after the first wavelength is switched to the second wavelength, the resource information generating unit 15 determines the first bandwidth as an available bandwidth for the switching candidate device. In contrast, when the resource reservation requests for which the ONU 2-1 has reserved bandwidths includes a resource reservation request for which the guaranteed delay time cannot be satisfied, the wavelength for the ONU 2-1 cannot be switched, and a total bandwidth that can be reserved by the ONU 2-2 is a bandwidth obtained by subtracting the bandwidths reserved by the ONU 2-1 from 10 Gbps. Subsequently, the OLT 1 may generate abstract resource information in a manner similar to the case where one wavelength is used, and output the abstract resource information to the controller 4.

In the example described above, the wavelength cannot be switched when there is a resource reservation request for which the guaranteed delay time cannot be satisfied. Alternatively, the wavelength may be switched in a time slot, if any, during which time slot, no transmission data are expected over an interruption time resulting from wavelength switching or longer, even when a guaranteed delay time in a resource reservation request cannot be satisfied. For example, as described above, the OLT 1 calculates an actual allocation amount of a bandwidth reserved in response to a resource reservation request in the status report allocation on the basis of the necessary amount of which an ONU 2 notifies the OLT 1. The OLT 1 can thus identify the time slot during which there is no data transmitted to the OLT 1, on the basis of the necessary amounts of which the ONUs 2 notify the OLT 1. When the wavelength is switched as described above, the OLT 1 updates the abstract resource information and transmits the abstract resource information to the controller 4.

A hardware configuration of the OLT 1 explained in the embodiment will now be described with reference to FIG.

Figure 17:
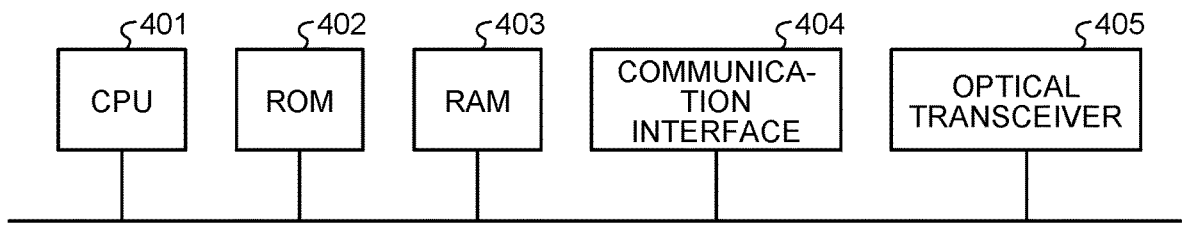
FIG. 17 is a diagram illustrating an example of a hardware configuration of an OLT in the embodiment.

17. FIG. 17 is a diagram illustrating an example of a hardware configuration of the OLT 1 in the present embodiment. As illustrated in FIG. 17, for example, the OLT 1 is implemented by a central processing unit (CPU) 401, which is a processor, a read only memory (ROM) 402, a random access memory (RAM) 403, a communication interface 404, and an optical transceiver 405. The CPU 401, the ROM 402, the RAM 403, the communication interface 404, and the optical transceiver 405 are connected with one another via a bus. The CPU 401 performs processing and control of the entire OLT 1. The ROM 402 stores programs such as boot programs, communication programs, and data analysis programs. The RAM 403 is used as a work area of the CPU 401. The communication interface 404 is connected with the layer 2 switches 3 and the controller 4, to transmit and receive signals to and from the connected devices.

The slice managing unit 11, the bandwidth allocating unit 12, the frame receiving unit 13, the frame transmitting unit 14, and the resource information generating unit 15 of the OLT 1 are implemented by software, firmware, or combination of software and firmware. For implementation of the frame receiving unit 13 and the frame transmitting unit 14, the optical transceiver 405 is also used. The software and firmware are described in the form of programs and stored in the ROM 402. The CPU 401 implements the functions of the frame transmitting unit 14, the frame receiving unit 13, the bandwidth allocating unit 12, the slice managing unit 11, and the resource information generating unit 15 by reading and executing the programs stored in the ROM 402.

An optical communication device according to the disclosure produces an effect of facilitating communication resource management at a controller that manages communication resources in a communication network including a PON system.

The configurations presented in the embodiment above are examples, and can be combined with other known technologies or can be partly omitted or modified without departing from the scope.

What is claimed is:

1. An optical communication device, the optical communication device being a master station device, the master station and a plurality of slave station devices defining a passive optical network system, the optical communication device being connected to a controller to manage communication resources in slices, the slices being virtual networks into which a network is divided, the optical communication device comprising:
a processor to execute a program; and
a memory to store the program that, when executed by the processor, performs:
a bandwidth allocating process of allocating bandwidths in the passive optical network system to the slave station devices through a plurality of allocation methods;
a slice managing process of calculating a guaranteed delay time associated with each of the allocation methods, holding the guaranteed delay time associated with each of the allocation methods, receiving, from the controller, a resource reservation request including a requested bandwidth requested to be reserved in the passive optical network system for a slice and a requested delay time in the passive optical network, and determining an allocation method associated with the resource reservation request on the basis of the requested delay time included in the resource reservation request and the guaranteed delay time for each of the allocation methods; and
a resource information generating process of holding, as resource information, an available bandwidth for each guaranteed delay time of each of the slave station devices, calculating an available bandwidth in the allocation method for a slave station device associated with the resource reservation request, on the basis of the allocation method associated with the resource reservation request and the requested bandwidth included in the resource reservation request, updating the resource information with the calculated available bandwidth, and transmitting, to the controller, the resource information as information abstracting resources in an entirety of the passive optical network system.

2. The optical communication device according to claim 1, wherein
the allocation methods include fixed allocation that allocates a fixed bandwidth per allocation period, and
when an allocation method associated with the resource reservation request is the fixed allocation, the resource information generating process updates an available bandwidth by subtracting, from the available bandwidth, the requested bandwidth included in the resource reservation request, the available bandwidth corresponding to a fixed bandwidth for the slave station device associated with the resource reservation request before a bandwidth corresponding to the resource reservation request is reserved.

3. The optical communication device according to claim 1, wherein
the allocation methods include status report allocation that allocates a bandwidth in accordance with a necessary amount at a slave station device of which the slave station device notifies the optical communication device, and
when the allocation method associated with the resource reservation request is the status report allocation, the resource information generating process updates an available bandwidth by subtracting, from the available bandwidth, the requested bandwidth included in the resource reservation request, the available bandwidth corresponding to the status report allocation for the slave station device associated with the resource reservation request before a bandwidth corresponding to the resource reservation request is reserved.

4. The optical communication device according to claim 3, wherein
the allocation methods further include best effort allocation in which no guaranteed delay time is set, and
when the allocation method associated with the resource reservation request is the status report allocation, the resource information generating process updates an available bandwidth by subtracting, from the available bandwidth, a bandwidth actually allocated by the bandwidth allocating unit to a slice associated with the resource reservation request, the available bandwidth corresponding to the best effort allocation for the slave station device associated with the resource reservation request before a bandwidth corresponding to the resource reservation request is reserved.

5. The optical communication device according to claim 1, wherein
the allocation methods include best effort allocation in which no guaranteed delay time is defined, and cooperative allocation that allocates bandwidths to the slave station devices on the basis of timings of transmission of data from the slave station devices and an amount of the data to be transmitted, the timings and the amount of the data being received from a control device that manages the timings and the amount of the data, and when the allocation method associated with the resource reservation request is the cooperative allocation, the resource information generating process updates an available bandwidth by subtracting, from the available bandwidth, a bandwidth actually allocated by the bandwidth allocating unit to a slice associated with the resource reservation request, the available bandwidth corresponding to the best effort allocation for the slave station device associated with the resource reservation request before a bandwidth corresponding to the resource reservation request is reserved.

6. The optical communication device according to claim 1, wherein the passive optical network system performs communication by time and wavelength division multiplexing method using a plurality of optical wavelengths, and in a case where an optical wavelength to be used by a switching candidate device that is one of the slave station devices is switched from a first wavelength to a second wavelength, when a first bandwidth that is an available bandwidth for the switching candidate device is larger than a second bandwidth that is an available bandwidth before the optical wavelength to be used is switched, and when a guaranteed delay time of a slice in which a bandwidth is reserved for the switching candidate device is satisfied even after the first wavelength is switched to the second wavelength, the resource information generating process determines the first bandwidth as an available bandwidth for the switching candidate device.

7. The optical communication device according to claim 1, wherein when the resource information generating process determines that the requested bandwidth included in the resource reservation request received from the controller cannot be reserved, the resource information generating process transmits, to the controller, a response indicating that resource reservation cannot be performed.

8. A resource management method performed by an optical communication device, the optical communication device being a master station device, the master station device and a plurality of slave station devices defining a passive optical network system, the optical communication device being connected to a controller that manages communication resources in slices, the slices being virtual networks into which a network is divided, the optical communication device being capable of allocating bandwidths in the passive optical network system to the slave station devices through a plurality of allocation methods, the resource management method comprising:

calculating a guaranteed delay time associated with each of the allocation methods, and holding the guaranteed delay time associated with each of the allocation methods;

receiving, from the controller, a resource reservation request including a requested bandwidth requested to be reserved in the passive optical network system for a slice and a requested delay time in the passive optical network, and determining an allocation method associated with the resource reservation request on the basis of the requested delay time included in the resource reservation request and the guaranteed delay time for each of the allocation methods; and holding, as resource information, an available bandwidth for each guaranteed delay time of each of the slave station devices, calculating an available bandwidth in the allocation method for a slave station device associated with the resource reservation request, on the basis of the allocation method associated with the resource reservation request and the requested bandwidth included in the resource reservation request, updating the resource information with the calculated available bandwidth, and transmitting, to the controller, the resource information as information abstracting resources in an entirety of the passive optical network system.

* * * * *